US010460026B2

(12) United States Patent
Wolfram et al.

(10) Patent No.: US 10,460,026 B2
(45) Date of Patent: Oct. 29, 2019

(54) METHODS AND SYSTEMS FOR GENERATING ELECTRONIC FORMS

(71) Applicant: Wolfram Research, Inc., Champaign, IL (US)

(72) Inventors: Stephen Wolfram, Concord, MA (US); Riccardo Di Virgilio, Monterosi (IT); Joel Klein, Urbana, IL (US); Jan Poeschko, Chicago, IL (US)

(73) Assignee: Wolfram Research, Inc., Champaign, IL (US)

( * ) Notice: Subject to any disclaimer, the term of this patent is extended or adjusted under 35 U.S.C. 154(b) by 181 days.

(21) Appl. No.: 15/485,923

(22) Filed: Apr. 12, 2017

(65) Prior Publication Data

US 2017/0220542 A1    Aug. 3, 2017

Related U.S. Application Data

(63) Continuation of application No. 15/483,121, filed on Apr. 10, 2017, which is a continuation of application (Continued)

(51) Int. Cl.
*G06F 17/24* (2006.01)
*G06F 8/60* (2018.01)
(Continued)

(52) U.S. Cl.
CPC .......... *G06F 17/243* (2013.01); *G06F 3/0482* (2013.01); *G06F 8/315* (2013.01);
(Continued)

(58) Field of Classification Search
None
See application file for complete search history.

(56) References Cited

U.S. PATENT DOCUMENTS 6,314,415 B1    11/2001  Mukherjee
6,342,907 B1    1/2002   Petty et al.
(Continued)

OTHER PUBLICATIONS

"MaskedTextBox.ValidatingType Property," Microsoft Developer Network, Jun. 21, 2014 (3 pages); available at https://msdn.microsoft.com/en-us/library/system.windows.forms.maskedtextbox.validatingtype(v=vs.110)aspx (last accessed Jun. 28, 2018).
(Continued)

*Primary Examiner* — Philip Wang
(74) *Attorney, Agent, or Firm* — Drinker Biddle & Reath LLP

(57) ABSTRACT

Programmer input in a programming language is received, the programmer input including i) specification data corresponding to an electronic form to be generated, and ii) a parameter that indicates a function to be applied to user input. The programmer input is evaluated to generate an electronic form object that includes one or more user-interface mechanisms for receiving the user input, wherein evaluating the programmer input includes evaluating the specification data and/or the parameter that indicates the function to generate code in the electronic form object which is capable of being processed by an application to render the electronic form. The electronic form object is generated such that the electronic form object is configured to apply, upon being processed by the application, the function to the user input received via the one or more user-interface mechanisms.

26 Claims, 33 Drawing Sheets

```
form = FormFunction[{"Website" -> <|"Interpreter" -> "SemanticURL"|>},
   Composition[HTTPRedirect, First], AppearanceRules -> <|"Title" -> "WebGo!",
   "Description" -> "Write the name of any website, and we will take you there!",
   "SubmitLabel" -> "Go!"|>]
```

Related U.S. Application Data

No. 14/549,541, filed on Nov. 20, 2014, now Pat. No. 9,619,217.

(60) Provisional application No. 61/906,888, filed on Nov. 20, 2013.

(51) Int. Cl.
*H04L 29/08* (2006.01)
*G06F 8/30* (2018.01)
*G06F 8/38* (2018.01)
*G06F 8/75* (2018.01)
*G06F 3/0482* (2013.01)
*G06F 17/22* (2006.01)
*G06F 17/28* (2006.01)

(52) U.S. Cl.
CPC .................. *G06F 8/38* (2013.01); *G06F 8/60* (2013.01); *G06F 8/75* (2013.01); *G06F 17/2247* (2013.01); *H04L 67/10* (2013.01); *G06F 17/28* (2013.01)

(56) References Cited

U.S. PATENT DOCUMENTS

| | | | |
|---|---|---|---|
| 6,889,260 B1 | 5/2005 | Hughes | |
| 7,010,796 B1* | 3/2006 | Strom | G06F 9/547 719/310 |
| 8,261,295 B1* | 9/2012 | Risbood | G06F 9/44505 719/328 |
| 8,589,869 B2 | 11/2013 | Wolfram | |
| 8,645,490 B2 | 2/2014 | Christensen | |
| 9,069,814 B2 | 6/2015 | Wolfram et al. | |
| 2002/0083072 A1 | 6/2002 | Steuart | |
| 2004/0233236 A1* | 11/2004 | Yang | G06F 9/451 715/763 |
| 2006/0116991 A1* | 6/2006 | Calderwood | G06F 9/547 |
| 2008/0222192 A1 | 9/2008 | Hughes | |
| 2012/0306898 A1* | 12/2012 | Scheidhauer | G06F 3/14 345/522 |
| 2013/0125094 A1 | 5/2013 | Wolfram et al. | |
| 2014/0164315 A1* | 6/2014 | Golshan | H04L 65/403 707/608 |
| 2014/0280323 A1* | 9/2014 | Seales | G06F 16/2471 707/770 |
| 2015/0142858 A1 | 5/2015 | Bryan et al. | |
| 2015/0154012 A1* | 6/2015 | Wolfram | G06F 8/60 717/176 |
| 2015/0169679 A1 | 6/2015 | Wolfram et al. | |
| 2015/0186193 A1* | 7/2015 | Jain | G06F 9/541 719/328 |
| 2015/0295781 A1* | 10/2015 | Maes | G06F 9/5072 715/735 |
| 2016/0026438 A1* | 1/2016 | Wolfram | G06F 16/00 717/109 |
| 2017/0212737 A1 | 7/2017 | Wolfram et al. | |
| 2017/0242835 A1 | 8/2017 | Wolfram et al. | |
| 2017/0242864 A1 | 8/2017 | Wolfram et al. | |
| 2017/0244789 A1 | 8/2017 | Wolfram et al. | |
| 2018/0004721 A1 | 1/2018 | Wolfram et al. | |

OTHER PUBLICATIONS

"Parse," Wikipedia entry (2 pages); retrieved from https://en.wikipedia.org/wiki/Parse_(company) on May 5, 2017.

Williams, "Appcelerator Acquires Singly, a Developer Platform for Integrating Third-Party Services," techcrunch.com, posted Aug. 22, 2013 (2 pages), retrieved from https://techcrunch.com/2013/08/22/appcelerator-acquires-singly-a-developer-platform-for-integrating-third-party-services/ on May 5, 2017.

Barnett, "Wolfram Alpha creator plans to delete the PDf," *The Telegraph*, Jun. 7, 2011, retrieved from http://www.telegraph.co.uk/technology/news/8561619/Wolfram-Alpha-creator-plans-to-delete-the-PDf.html on Jan. 20, 2016.

"Providing a URI for a remote file," dated Sep. 22, 2009, retrieved from http://web.archive.org/web/20120922194818/http://www.java2s.com/Tutorial/Java/0180File/ProvidingaURIforaremotefile.htm on Feb. 22, 2016.

Wolfram et al., U.S. Appl. No. 15/483,121, "Methods and Systems for Generating Application Programming Interfaces," filed Apr. 10, 2017.

Walkenbach, Creating Wizards and Creating Mega formulas in *Excel 2013 Power Programming with VBA*, John Wiley & Sons, 10 pages. (2013).

"Calculator Using Excel VBC UserForm," ANALYSISTABS, available at https://analysistabs.com/vba-code/excel-projects/calculator-userform, accessed Jan. 2, 2018, 16 pages (Dec. 24, 2015).

Familiar, Deploy Packages in Microservices, *IoT, and Azure: Leveraging DevOps and Microservice Architecture to Delivery SaaS Solutions*, Apress, 4 pages (2015).

\* cited by examiner

In[1]:=CloudDeploy[Manipulate[ContourPlot3D[x^2 + y^2 +az^3 == 1, {x, -2, 2}, {y, -2, 2}, {Z, -2, 2}, Mesh -> None], {a, -2, 2}]]

Out[1]: CloudObject[https://www.wolframcloud.com/objects/d13d97f6-33da-47b7-9b1f-52304ea9c62b]

In[1]:=CloudPut[47!, "myfile"]

Out[1]: CloudObject[https://www.wolframcloud.com/objects/user-b0c28e9f-876d-4478-9d8b-937d18a9ea81/myfile In[2]:=CloudGet["myfile"]

Out[2]: 258 623 241 511 168 180 642 964 355 153 611 979 969 197 632 389 120 000 000 000 form = FormFunction[{"first"->"String", "second" -> "Number"}, f]

form = FormFunction[{("first", "String") ->"String", ("second", "Number") -> "Number"}, f]

1100
1004
1008
1012

1150
1154 String 1054
1158 Number 1058
Cancel 1074
Submit 1070 form = FormFunction[{("first", ✦) ->"String", ("second", "Number"} -> "Number"}, f]

1004  1204  1008  1012

← 1400 form = FormFunction[{"x"->"Color"}, func]

form = FormFunction[{"x"->"image"}, func]

form = FormFunction[{"x"->"Boolean"}, func]   ← 1600 form = FormFunction[{"Product"-> {"Flyers", "Business Cards", "Leaflets"}, func,
    AppearanceRules -> <|"SubmitLabel" -> "Buy now!"|>]

form = FormFunction[{"Age"->"Number"}, func, FormTheme -> Red]

form = FormFunction[{"Age"->"Number"}, func, FormTheme -> White]

form = FormFunction[{"Age"->"Number"}, func, FormTheme -> Blue]

form = FormFunction[{"Website" -> <|"Interpreter" -> "SemanticURL"|>}, Composition[HTTPRedirect, First], AppearanceRules -> <|"Title" -> "WebGo!", "Description" -> "Write the name of any website, and we will take you there!", "SubmitLabel" -> "Go!"|>]

FIG. 20A
CloudDeploy[FormFunction[{"from" -> "Airport", "to" -> "Airport"},
  GeoGraphics[GeoPath[{GeoPosition[$$from], GeoPosition[$$to]}]], &, "PNG"]]
FIG. 20B
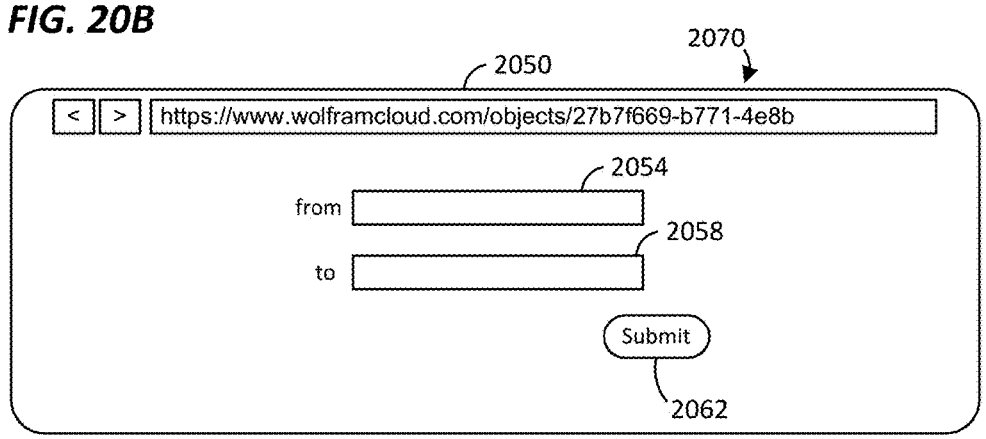
FIG. 20C
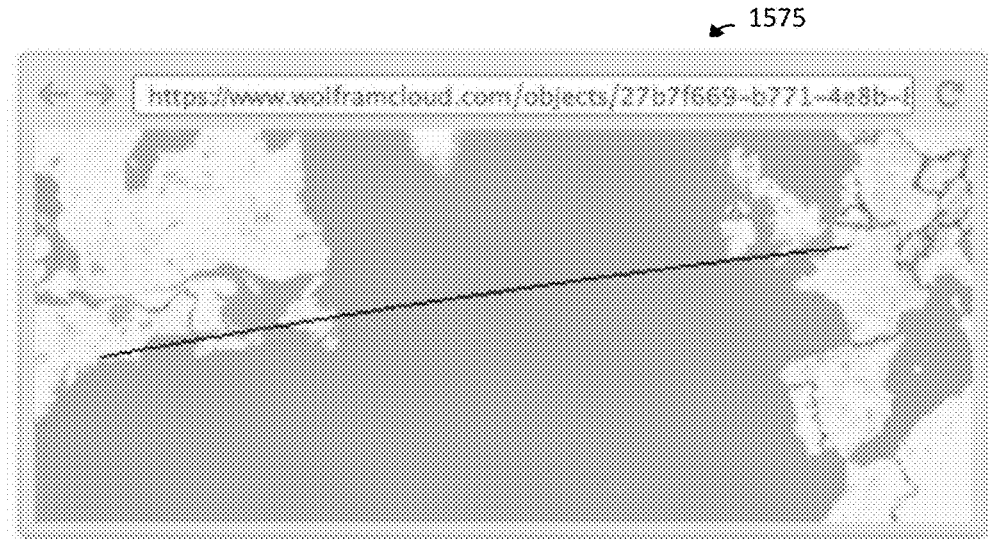

In[1]:= CloudDeploy[APIFunction[{"name"->"Country", GeoGraphics[Polygon[#country]] &, "PNG"]]

Out[1]:= CloudObject[https://www.wolframcloud.com/objects/d9263a7-f6a3-499e-bca0-b28a27ddb83c]

← 2700

2704
2708

← 2800

Open a connection to a weather station device, configure it, and read in the ambient humidity:

In[1]:= dev = DeviceOpen["TinkerForgeWeatherStation"]

Out[1]= DeviceObject[ Class: TinkerForgeWeatherStation  ID: 1
          Status: ○ Connected ]

In[2]:= DeviceConfigure[dev, "BarometerBrickletUID" → "bUl"]

In[3]:= DeviceRead[dev, "Humidity"]

Out[3]= 21.4%

Close the device:

In[4]:= DeviceClose[dev]

In[1]:= dev = DeviceOpen["TinkerForgeWeatherStation"]

Out[1]= DeviceObject[ Class: TinkerForgeWeatherStation  ID: 1
                     Status: ○ Connected ]

In[2]:= DeviceConfigure[dev, "LCDBrickletUID" → "gLp"]; DeviceWrite[dev, "This is a string"];

Use DeviceExecute to clear the screen:

In[3]:= DeviceExecute[dev, "ClearLCDDisplay"]

In[1]:= dev = DeviceOpen["SerialDemo", "~Sphero~"]

Out[1]= DeviceObject[ Class: SerialDemo  ID: 1
                     Status: ○ Connected (/dev/tty.Sphero-WRO-AMP-SPP) ]

In[2]:= DeviceWrite[dev, FromCharacterCode[{255, 255, 0, 1, 5, 1, 248}]];

In[3]:= DeviceExecute[dev, "SerialReadyQ"]

Out[3]= True

Flush the buffered data and check that the buffer is empty:

In[4]:= DeviceExecute[dev, "ReadFlush"]

In[5]:= DeviceExecute[dev, "SerialReadyQ"]

Out[5]= False

Asynchronously read from a demo device that retrieves cookies from a specified URL, calling URLFetchAsynchronous in the background:

In[1]:= fun[_, "cookies", data_] := cookies = data

In[2]:= DeviceExecuteAsynchronous[DeviceOpen["AsynchronousDemo"], "Read", "wolfram.com", fun]

The retrieved cookies:

In[3]:= cookies

Out[3]= {{Domain → .wolfram.com, Path → /, Secure → FALSE,
    Expires → Fri 12 Apr 2024 22:32:49, Name → WR_SID, Value → a051205966534db391904d},
  {Domain → user.wolfram.com, MachineAccess → FALSE, Path → /, Secure → FALSE,
    Expires → Thu 1 Jan 1970 00:00:00, Name → PHPSESSID, Value → m8kl9367iras86v1tq9etg1345},
  {Domain → .wolframcloud.com, Path → /, Secure → FALSE, Expires → Fri 12 Apr 2024 22:33:56,
    Name → WR_SID, Value → 172.26.3.172.1397601152216632},
  {Domain → #HttpOnly_www.wolframcloud.com, MachineAccess → FALSE,
    Path → /, Secure → FALSE, Expires → Thu 1 Jan 1970 00:00:00,
    Name → JSESSIONID, Value → A9CBDC57A88481F98B64C446501C7B3B},
  {Domain → #HttpOnly_www.wolframcloud.com, MachineAccess → FALSE, Path → /,
    Secure → FALSE, Expires → Thu 1 Jan 1970 00:00:00, Name → AWSELB, Value →
      C73773D31018B33071B2BCAF309546EEA98E5E70DBD96BC04CC1337B746ECE2B9FC833E088·.
      F6813C414E1D4802A06F0DF61DD89353452552872318B356B805F8537FEB13D44·.
      479005040F9D3E100A8813B9DF0ED58},
  {Domain → .wolframalpha.com, Path → /, Secure → FALSE,
    Expires → Fri 12 Apr 2024 22:36:47, Name → WR_SID, Value → 10.5.18.5.1397601321424189},
  {Domain → #HttpOnly_api.wolframalpha.com, MachineAccess → FALSE,
    Path → /, Secure → FALSE, Expires → Thu 1 Jan 1970 00:00:00,
    Name → JSESSIONID, Value → 70F04BB6622F1EC8A05DAD5468FDDA04}}

← 3200

This uses EmbedCode with CloudDeploy to generate a string that can be inserted into the HTML of a web page:

In[1]:= EmbedCode[CloudDeploy[APIFunction[{"x" → "Integer", "y" → "Integer"}, 2#+3#y &]]]

Out[1]= <iframe
    src="https://www.wolframcloud.com/objects/28930884-8576-4976-b447-ccb689ecfa47?
    _embed=iframe" width="600" height="600" />

In[1]:= EmbedCode[
    CloudDeploy[APIFunction[{"x" → "Integer"}, 2#1 &], Permissions → "Public"], "Python"]

Out[1]=
Embeddable Code
Use the code below to call the Wolfram Cloud function from Python:

Code                                          Copy to Clipboard

```
from urllib import urlencode
from urllib2 import urlopen class WolframCloud:

def wolfram_cloud_call(**args):
        arguments = dict([(key, arg) for key, arg in args.iteritems()])
        result = urlopen("http://www.wolframcloud.com/objects/1a9faaeb-2144-455e-a8ac-88b10a3a4b47", urlencode(arguments))
        return result.read()

def call(x):
        return wolfram_cloud_call(x=x)
```

Create a cloud object:

In[1]:= co = CloudDeploy[APIFunction[{"x" → "Integer"}, #&^2 &], Permissions → "Public"]

Out[1]= CloudObject[https://www.wolframcloud.com/objects/60072746-e1a3-4265-8109-62bc690b27c3]

Generate a complete Java file to call the cloud object that can be pasted into a Java project:

In[2]:= EmbedCode[co, "Java", ExternalTypeSignature → {{"int"}, "int"}]

METHODS AND SYSTEMS FOR GENERATING ELECTRONIC FORMS

CROSS-REFERENCES TO RELATED APPLICATIONS

This application is a continuation of U.S. patent application Ser. No. 15/483,121, filed Apr. 10, 2017, entitled "Methods and Systems for Generating Application Programming Interfaces," which is a continuation of U.S. patent application Ser. No. 14/549,541, filed Nov. 20, 2014, now U.S. Pat. No. 9,619,217, entitled "Methods and Systems for Cloud Computing," which claims the benefit of U.S. Provisional Application No. 61/906,888, filed Nov. 20, 2013, entitled "Cloud Computing Platform." All of the applications referenced above are hereby incorporated by reference herein in their entireties.

FIELD OF THE DISCLOSURE

The present disclosure generally relates to cloud computing, and more particularly, systems that enable development and deployment of electronic forms.

BACKGROUND

The present availability of high-capacity networks, computing power, and storage, as well as the widespread adoption of hardware virtualization, service-oriented architecture, and autonomic and utility computing have led to a growth in cloud computing.

In cloud computing, multiple remote servers (usually a large number) are networked to allow centralized data storage and online access to computer services or resources. Cloud resources are typically shared by multiple users and also dynamically reallocated based on demand.

Platform as a Service (PaaS) is a category of cloud computing services in which a computing platform and a solution stack are provided as a service. In PaaS, a provider provides a user with tools and/or libraries for creating an application or service to be hosted on the provider's platform, i.e., servers, storage, and other services that are required to host users' applications. Since PaaS systems typically support only a limited number of programming languages and frameworks, however, adopting a PaaS system may require utilizing an unfamiliar language and/or programming framework. PaaS systems often are also inflexible.

Many software programs prompt a user to enter information via a computer. The user interfaces utilized to elicit user information are often referred to as forms. Writing software to generate such forms is typically time consuming.

Some electronic forms are designed as web pages so that a user can access and enter data into a form using a web browser. Web documents may contain content, markup language (e.g., Hypertext Markup Language (HTML), Extensible Hypertext Markup Language (XHTML), Extensible Markup Language (XML), etc.) elements, stylesheets (e.g., Cascading Style Sheets (CSS)), scripts (e.g., JAVASCRIPT®, etc.). Designing web documents using HTML, XHTML, etc., can be time consuming.

WYSIWYG (what you see is what you get) website builders are tools that provide a visual interface for website design; that is, the user of a WYSIWYG website builder is not required to learn code. Such website builders have a gentle learning curve and allow novices to build a website and get it running live on the Internet relatively quickly, although designing web documents using a WYSIWYG builder is still time consuming. Additionally, website builders are inflexible and have limitations with respect to creating web pages that differ from a fixed set of templates.

On the other hand, web editors are tools to facilitate manual construction of websites, and are highly flexible as compared to website builders. As with other web design tools, designing web documents using a web editor is time consuming. Additionally, web editors typically require users to have significant knowledge of web page coding and languages (e.g., HTML, XML, CSS, JAVASCRIPT®, etc.).

SUMMARY OF THE DISCLOSURE

In one embodiment, a method for generating an electronic form includes: receiving, at one or more computers, programmer input in a programming language, the programmer input including i) specification data corresponding to an electronic form to be generated, and ii) a parameter that indicates a function to be applied to user input; and evaluating, at one or more computers, the programmer input to generate an electronic form object that includes one or more user-interface mechanisms for receiving the user input, wherein: evaluating the programmer input to generate the electronic form object includes evaluating the specification data and/or the parameter that indicates the function to generate code in the electronic form object, the generated code capable of being processed by an application to render the electronic form on a display device, and the electronic form object is generated such that the electronic form object is configured to apply, upon being processed by the application, the function to the user input received via the one or more user-interface mechanisms. The method also includes storing the electronic form object in a memory of or communicatively coupled to the one or more computers.

In another embodiment, a system for generating an electronic form comprises: one or more processors; and one or more memory devices coupled to the one or more processors. The one or more memories store machine readable instructions that, when executed by the one or more processors, cause the one or more processors to: receive programmer input in a programming language, the programmer input including i) specification data corresponding to an electronic form to be generated, and ii) a parameter that indicates a function to be applied to user input, cause the programmer input to be evaluated to generate an electronic form object that includes one or more user-interface mechanisms for receiving the user input, wherein: evaluating the programmer input to generate the electronic form object includes evaluating the specification data and/or the parameter that indicates the function to generate code in the electronic form object, the generated code capable of being processed by an application to render the electronic form on a display device, and the electronic form object is generated such that the electronic form object is configured to apply, upon being processed by the application, the function to the user input received via the one or more user-interface mechanisms. The one or more memories also store machine readable instructions that, when executed by the one or more processors, cause the one or more processors to store the electronic form object in the one or more memories of the system and/or cause the electronic form object to be stored in one or more other memories communicatively coupled to the system.

In yet another embodiment, a tangible, non-transitory computer readable medium or media stores instruction thereon that, when executed by one or more computer processors, cause the one or more computer processors to:

receive programmer input in a programming language, the programmer input including i) specification data corresponding to an electronic form to be generated, and ii) a parameter that indicates a function to be applied to user input; and cause the programmer input to be evaluated to generate an electronic form object that includes one or more user-interface mechanisms for receiving the user input, wherein: evaluating the programmer input to generate the electronic form object includes evaluating the specification data and/or the parameter that indicates the function to generate code in the electronic form object, the generated code capable of being processed by an application to render the electronic form on a display device, and the electronic form object is generated such that the electronic form object is configured to apply, upon being processed by the application, the function to the user input received via the one or more user-interface mechanisms. The tangible, non-transitory computer readable medium or media also stores instruction thereon that, when executed by one or more computer processors, cause the one or more computer processors to: cause the electronic form object to be stored in one or more memories of a computer system.

BRIEF DESCRIPTION OF THE DRAWINGS

FIG. 20A is an example of programming input that may be utilized to generate an electronic form, according to an embodiment.

FIG. 20B is an illustration of an electronic form generated in response to the programming input of FIG. 20A, according to an embodiment.

FIG. 20C is an illustration of output generated in response to user input received via the electronic form of FIG. 20B, according to an embodiment.

FIG. 29 is an illustration of a notebook of the computational application including example programmer input for interacting with a remote device, according to an embodiment.

FIG. 30 is an illustration of a notebook of the computational application including example programmer input for interacting with a remote device, according to an embodiment.

FIG. 31 is an illustration of a notebook of the computational application including example programmer input for interacting with a remote device, according to an embodiment.

FIG. 33 is an illustration of a notebook including example programmer input in a first programming language for generating code in a second programming language for accessing an API deployed to network-accessible storage, according to an embodiment.

FIG. 34 is an illustration of a notebook including example programmer input in a first programming language for generating code in a second programming language for accessing an API deployed to network-accessible storage, according to an embodiment.

FIG. 35 is an illustration of a notebook including example programmer input in a first programming language for generating code in a second programming language for accessing an API deployed to network-accessible storage, according to an embodiment.

FIG. 36 is an illustration of a notebook including example programmer input in a first programming language for generating code in a second programming language for accessing an API deployed to network-accessible storage, according to an embodiment.

DETAILED DESCRIPTION

Figure 1:
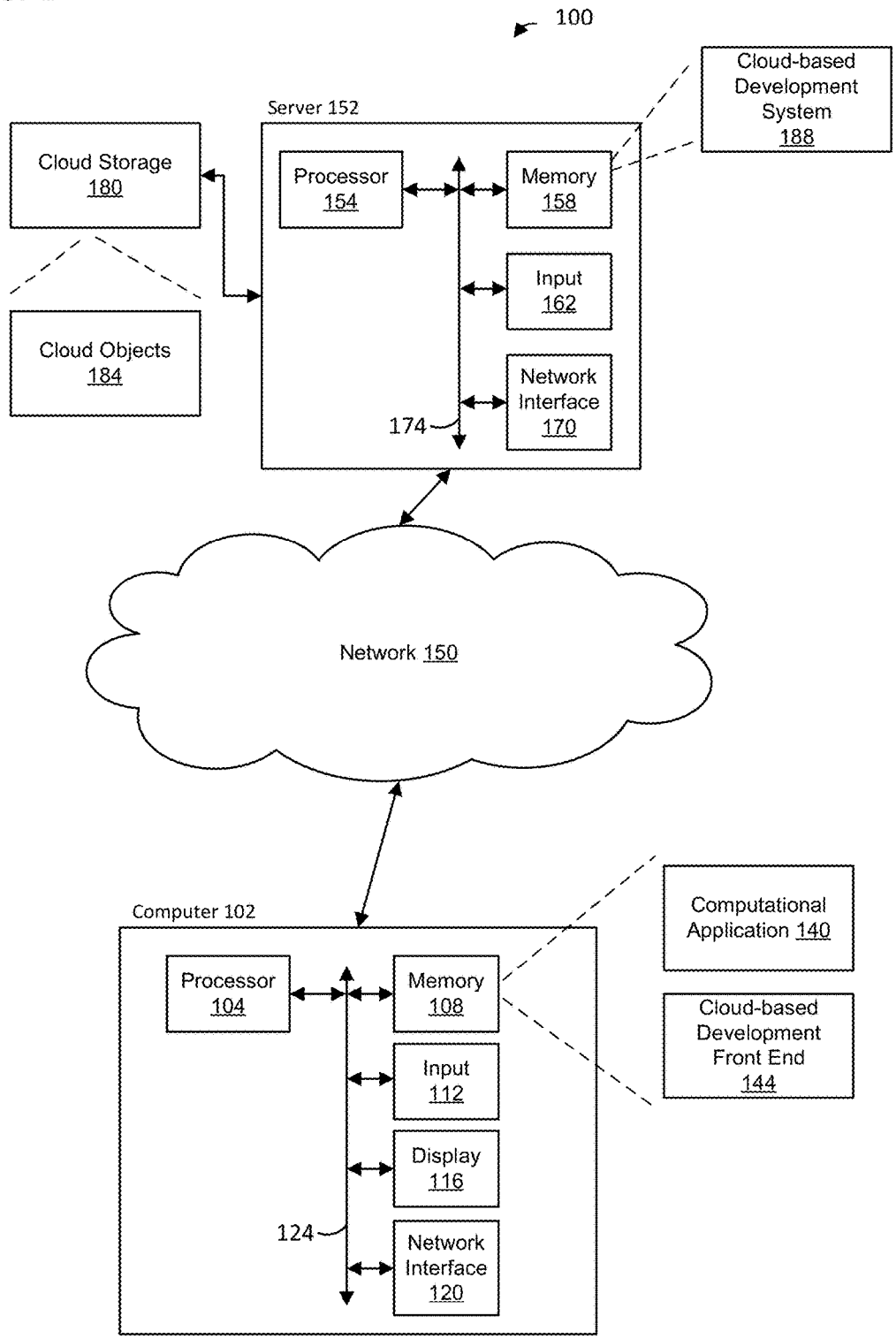
FIG. 1 is a diagram of an example system for cloud-based development system, according to an embodiment.

FIG. 1 is a diagram of an example system 100 for creating cloud objects, deploying objects to a cloud server system, and/or utilizing cloud services provided by the cloud server system, according to an embodiment. Examples of cloud objects include data, programs, functions, forms, application programming interfaces (APIs), etc., according to various embodiments. The cloud server system may make cloud objects privately and/or publicly available via a network such as an intranet, an extranet, the Internet, etc.

In various embodiments, the system 100 cloud-based computing architecture facilitates integration between and among desktop applications, mobile applications, web-based applications, hobbyist applications, etc. For example, in various embodiments, the system 100 supports one of or any suitable combination of two or more of programming infrastructure (e.g., various software development activities); data analytics infrastructure (e.g., analysis of big data); remote processing infrastructure (e.g., including cloud storage and execution of user-defined functions and computer code); programming language translation/generation infrastructure (e.g., providing translation between programming languages and/or automated generation of computer code); application programming interface (API) infrastructure (e.g., operable to automatically generate, implement, and/or document APIs according to use specifications; and other infrastructure as described below. The infrastructure may be software or hardware based infrastructure, or a combination of both software and hardware infrastructure.

In an embodiment, the system 100 includes one or more computers, such as a computer 102. The computer 102 includes one or more processors 104 and one or more memory devices 108. The computer 102 also includes, or is coupled to, one or more input devices 112. Additionally, the computer 102 includes, or is coupled to, one or more display devices 116. In some embodiments, the computer 102 includes one or more network interface devices 120. The one or more processors 104, the one or more memory devices 108, the one or more input devices 112 (sometime referred to herein as "the input device 112" for brevity), the one or more display devices 116 (sometime referred to herein as "the display device 116" for brevity), the one or more network interface devices 120 (sometime referred to herein as "the network interface device 120" for brevity), etc., may be communicatively coupled via one or more busses 124 (sometime referred to herein as "the bus 124" for brevity). In other embodiments, the computer 102 may have other suitable structures and/or components.

The one or more processors 104 (sometime referred to herein as "the processor 104" for brevity) may comprise one or more general purpose processors (e.g., a central processing unit), one or more special purpose processors (e.g., a co-processor, a graphics processor, etc.). At least one of the one or more processors 104 executes machine readable instructions stored in the memory 108. The one or more memory devices 108 (sometime referred to herein as "the memory 108" for brevity) include one or more of random access memory (RAM), read only memory (ROM), a FLASH memory, a magnetic disk drive, an optical disk drive, etc.

The one more input devices 112 include one or more suitable input devices such as a keyboard, a key pad, a mouse, a trackball, one or more buttons, a touch screen that overlays a display device, etc. The one or more network interface devices 120 comprise one or more suitable network interface devices (NICs) such as a wired network NIC, a wireless network NIC, etc.

In some embodiments, the memory 108 may store a computational application 140 such as the MATHEMATICA® computational application from Wolfram Research, Inc., a spreadsheet application, etc., where the computational application 140 is configured to create cloud objects, deploy objects to a cloud server system, and/or utilize cloud services provided by the cloud server system. For example, in an embodiment, the computational application 140 may include a cloud-based development front end 144 that enables creation of cloud objects, deployment of objects to the cloud server system, and/or utilization of cloud services provided by the cloud server system, according to various embodiments. In some embodiments, the computational application 140 is configured to provide an electronic user interface such as a workspace (e.g., a notebook, a spreadsheet, a document, etc.) in which a user can enter software code and/or functions to be evaluated, cause the functions to be evaluated, and/or view results of the evaluations.

In some embodiments, however, the computational application 140 is omitted and the cloud-based development front end 144 is a standalone application and/or module. In some embodiments, the cloud-based development front end 144 is incorporated into another suitable application different than the computational application 140.

In various embodiments, the computer 102 comprises a desktop computer, a workstation, a laptop computer, a tablet computer, a smart phone, a personal digital assistant, a gaming system, a server, etc.

In some embodiments, the computer 102 (and/or other computers (not shown) are coupled to a network 150. The network 150 may comprise one or more of a local area network (LAN), a wide area network (WAN), a metropolitan area network (MAN), a mobile communications network, an intranet, an extranet, the Internet, etc.

In some embodiments, the system 100 may include one or more servers such as the server 152. FIG. 1 illustrates a single server 152 for brevity, but the system 100 includes multiple other similarly configured servers in some embodiments. In some embodiments, multiple servers (including the server 152) are networked together to provide online access to data storage and computer services or resources via the network 150. One server 152 will be discussed in detail with respect to FIG. 1, and other servers (if included) have the same or a similar suitable structure, in some embodiments.

The server 152 includes one or more processors 154 and one or more memory devices 158. The server 152 also may include, or be coupled to, one or more input devices 162. The server 152 includes one or more network interface devices 170. The one or more processors 154, the one or more memory devices 158, the one or more input devices 162 (sometime referred to herein as "the input device 162" for brevity), the one or more network interface devices 170 (sometime referred to herein as "the network interface device 170" for brevity), etc., may be communicatively coupled via one or more busses 174 (sometime referred to herein as "the bus 174" for brevity). In other embodiments, the server 152 may have other suitable structures and/or components.

The one or more processors 154 (sometime referred to herein as "the processor 154" for brevity) may comprise one or more general purpose processors (e.g., a central processing unit), one or more special purpose processors (e.g., a co-processor, a graphics processor, etc.). At least one of the one or more processors 154 executes machine readable instructions stored in the memory 158. The one or more memory devices 158 (sometime referred to herein as "the memory 158" for brevity) include one or more of random access memory (RAM), read only memory (ROM), a FLASH memory, a magnetic disk drive, an optical disk drive, etc.

The one more input devices 162 include one or more suitable input devices such as a keyboard, a key pad, a mouse, a trackball, one or more buttons, a touch screen that overlays a display device, etc. The one or more network interface devices 170 comprise one or more suitable NICs such as a wired network NIC, a wireless network NIC, etc. The server 152 is communicatively coupled to the computer 102 and other computers (not shown) via the communication network 150. The server 152 may be communicatively coupled to other cloud servers (not shown) via another network (not shown) and/or the network 150, in various embodiments.

Additionally, in some embodiments, the server 152 may be communicatively coupled to a cloud storage database system 180, which may comprise one or more suitable databases. The cloud storage database system 180 stores objects (cloud objects) 184 that are accessible, via the server 152 or another server, to computers (e.g., the computer 102) via the network 150.

In an embodiment, the memory 158 may store a cloud-based development system 188. In various embodiments, the cloud-based development system 188 is configured to interface with the cloud-based development front end 144 to transfer objects from the computer 102, to store objects in the cloud storage database 180, and/or to make objects 192 in the cloud storage database 180 accessible to computers via the network 150. In some embodiments, the computational application 140 is implemented as a kernel running on the server 152 and a front end running on the computer 102. In such embodiments, the cloud-based development system 188 includes the kernel. In some embodiments, the computational application 140 is included in the cloud-based development system 188 and the computer 102 runs a thin client such as a web browser. In some embodiments, aspects of the computational application 140 running on the server 152 (e.g., the kernel) are separate from the cloud-based development system 188.

In some embodiments, a user can utilize the computational application 140 and/or the cloud-based development front end 144, running on the computer 102, to create objects that are to be deployed to the cloud. The cloud-based development front end 144 may then interface with the cloud-based development system 188 to transfer the created objects to the server 152. The server 152 may then store the objects in the cloud storage database 180 and make the objects available to one or more computers via the network 150, or another network (not shown).

In some embodiments, the server 152 may be communicatively coupled to an answering system and/or natural language processing system such as described in U.S. Pat. No. 8,589,869 and/or U.S. patent application Ser. No. 13/678,168, filed Nov. 15, 2012, which are hereby incorporated by reference herein in their entireties. In some embodiments, the cloud-based development system 188 may interface with such systems and utilize natural language processing capabilities of such systems to process user input, for example.

In some embodiments, the server 152 utilizes virtualization techniques.

In various embodiments, a user can create a document, notebook, spreadsheet, program, etc., that is executed on the computer 102 (or another computer, now shown) and that is configured to utilize cloud objects 184. For example, in some embodiments, a notebook, spreadsheet, program, etc., executed on the computer 102 stores data as a cloud object 184. As another example, in some embodiments, a document, notebook, spreadsheet, program, etc., executed on the computer 102 accesses data stored as a cloud object 184. As yet another example, in some embodiments, a notebook, spreadsheet, program, etc., executed on the computer 102 utilizes a cloud object 184 to perform a function and/or computation, a result of which is utilized by the notebook, spreadsheet, program, etc., which is executed on the computer 102.

Thus, in various embodiments, the cloud-based development system 188 may include various functional modules such one of or any suitable combination of two or more of a computational kernel (e.g., a MATHEMATICA® kernel) for performing pre-defined functions and for executing computer-readable instructions based on an associated language (e.g., the Wolfram Language™); a data analysis engine configured to classify data in one or more data sets and/or to perform analysis, sometimes in cooperation with the computational kernel or other functional modules, of data in one or more data sets; a module to generate code in different programming languages; a module to generate and/or implement APIs; a module to interpret free-form data and/or convert the free-form data into structured data; a module to classify data sets; a module to facilitate cloud execution of various computational functions requested from external devices (e.g., other computers, servers, and/or embedded devices) by, for example, receiving and answering function calls originating in software executing on those external devices; a module to generate and/or update reports based on various datasets stored in the cloud or passed to the functional module from an external device; etc.

Cloud Computing

In various embodiments, a programming language includes built-in functions that facilitate one or more of deployment of objects to the cloud, access to objects in the cloud, and/or manipulation of objects in the cloud. In various embodiments, one or more of the computational application 140, the cloud-based development front end 144, and the cloud-based development system module 188 are configured to evaluate such built-in functions to deploy objects to the cloud, access objects in the cloud, and/or manipulate objects in the cloud.

For example, in an embodiment, a CloudDeploy function enables a programmer to deploy an expression to the cloud, where the deployed expression can be software code that can be executed (e.g., by the server 152), data that can be accessed and/or manipulated, etc. For example, in various embodiments, one or more of the following syntaxes are utilized:

CloudDeploy[expr]

In this example, an expression expr is deployed as a cloud object, and the server 152 assigns a universal resource identifier (URI) to the cloud object. In some embodiments, the URI may include a universally unique identifier (UUID), such as the UUID standardized by the Open Software Foundation (OSF) as part of the Distributed Computing Environment (DCE). The URI may be a universal resource locator (URL), in some embodiments. Evaluation of this function returns a handle to the cloud object. The cloud object can then be accessed using the handle.

CloudDeploy[expr, "uri"]

In this example, an expression expr is deployed as a cloud object at a given URI.

CloudDeploy[expr, CloudObject["uri"]]

In this example, an expression expr is deployed to a given cloud object. CloudObject is a handle to a cloud object at a specified URI.

Figures 2A, 2B:
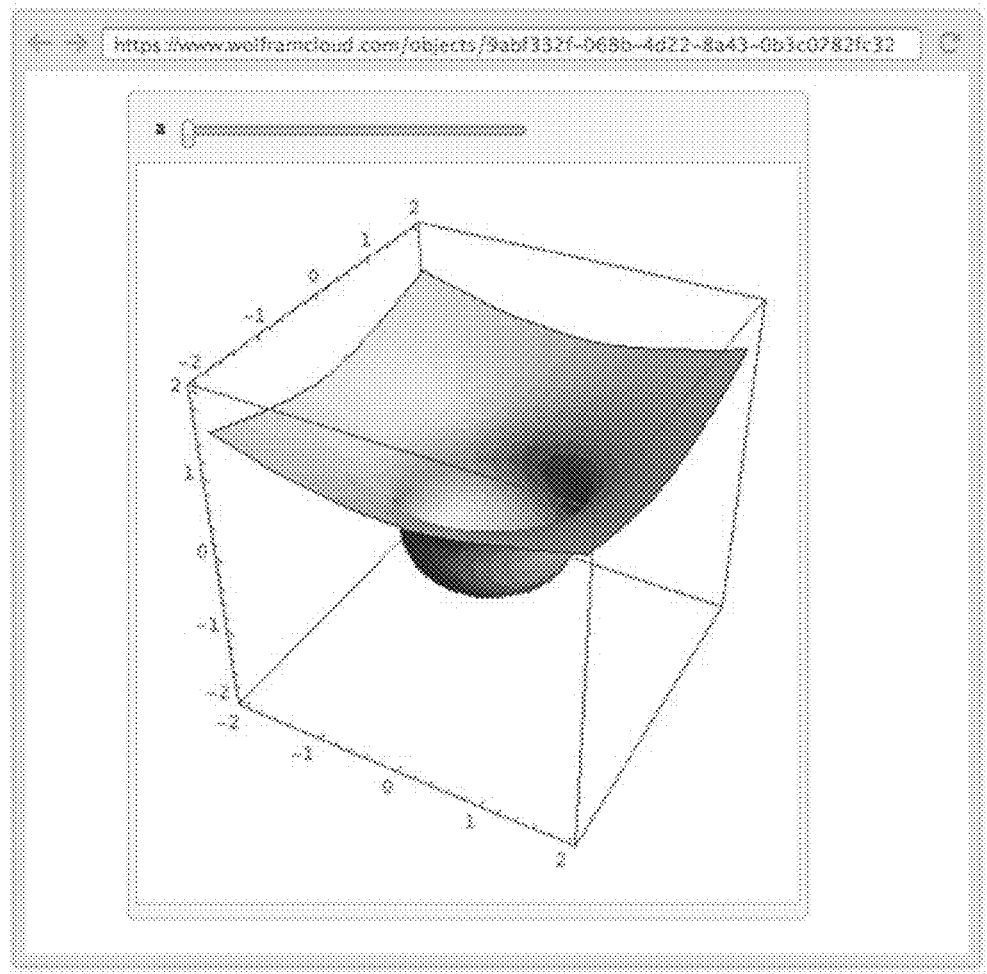
FIG. 2A is an example of programmer input utilized to deploy a user-manipulatable 3-dimensional (3D) plot to a network-accessible storage, according to an embodiment.
FIG. 2B illustrates an example web page that a user can access after evaluation of the programmer input of FIG. 2A, according to an embodiment.

FIG. 2A is an example in which a programmer utilizes the CloudDeploy function to deploy a user-manipulatable 3-dimensional (3D) plot to a server such as the server 152 (FIG. 1). In the example of FIG. 2A, the expression to be deployed includes a built-in function of MATHEMATICA®, Manipulate. The Manipulate function can be utilized to generate user-manipulatable plots, or other suitable displays. Evaluation of the CloudDeploy function in FIG. 2A returns a handled corresponding to deployment of the expression. FIG. 2B illustrates a web page that a user sees when entering a URI, corresponding to the handle, in a web browser. In particular, the web page includes a user-manipulatable 3D plot corresponding to an evaluation of the Manipulate function in FIG. 2A.

In some embodiments, CloudDeploy can be utilized with one or more suitable options. For example, in some embodiments, parameters can be utilized with CloudDeploy to specify when the deployed object is to be evaluated. For instance, in some embodiments, one or more parameters can be specified to indicate one or more of i) that a deployed object is to be evaluated when the object is accessed on the web, ii) that the deployed object is to be dynamically auto refreshed on the web, iii) that the deployed object is to be reevaluated on a schedule, etc. As another example, one or more parameters can be specified to indicate one or more of i) the object is to be private to the user (e.g., the object can only be accessed by the user), ii) the object is to be public (e.g., the object is publicly available on the web), iii) the object is to be available to specified users, iv) the object is to be available to one or more classes of users, etc.

In some embodiments, a programming language provides built-in functions to allow programs to utilize cloud storage for retrieving input to be processed, storing variables, storing generated output, etc., for example. For instance, in an embodiment, a CloudPut function enables a programmer to write an expression to the cloud, where the expression can be software code that can be executed (e.g., by the server 152), data that can be accessed and/or manipulated, etc. For example, in various embodiments, one or more of the following syntaxes are utilized:

CloudPut[expr]

In this example, an expression expr is written to a new cloud object, and the server 152 assigns a universal resource identifier (URI) to the cloud object. Evaluation of this function returns a handle to the object. The cloud object can then be accessed using the handle.

CloudPut[expr, "uri"]

In this example, an expression expr is written to a cloud object at a given URI.

CloudPut[expr, CloudObject["uri"]]

In this example, an expression expr is written to a given cloud object.

As another example, in an embodiment, a CloudGet function enables a programmer to read an object in the cloud, and evaluate expression(s) included in the object, where a result of a last evaluated expression is returned. For example, in various embodiments, one or more of the following syntaxes are utilized:

CloudGet["uri"]

In this example, an object in the cloud at a given URI is read, and each expression included in the object is evaluated. A result of a last evaluated expression is returned.

CloudGet[CloudObject["uri"]]

In this example, a given cloud object is read.

Figures 3, 4:
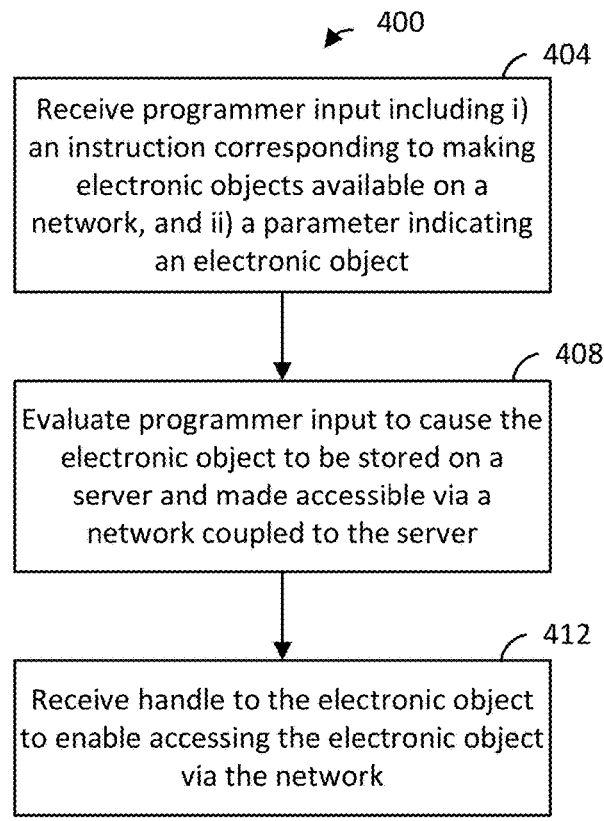
FIG. 3 is an example of programmer input utilized to store and retrieve an object to/from network-accessible storage, according to an embodiment.
FIG. 4 is a flow diagram of an example method for deploying an object to network-accessible storage, according to an embodiment.

FIG. 3 is an example in which a programmer utilizes the CloudPut function to write an expression (e.g., a factorial) to a server such as the server 152 (FIG. 1). A URI parameter "myfile" is utilized to specify a cloud object to which the expression is to be written. Evaluation of the CloudPut function in FIG. 3 returns a handle to the cloud object to which the expression was written. A programmer subsequently utilizes the CloudGet function to read from the cloud object specified by the URI "myfile". In response, an evaluation of the expression 47! is returned.

FIG. 4 is a flow diagram of an example method 400 for deploying objects to a cloud environment to enable accessing the objects via a network. In some embodiments, the method 400 may be implemented at one or more computers, such as the computer 102 and/or the server 152 of FIG. 1. Merely for explanatory purposes, FIG. 4 is described in the context of the method 400 implemented by the computer 102. In other embodiments, however, the method 400 may be implemented jointly at the computer 102 and the server 152, at another suitable computer (not shown in FIG. 1), at one or more other computers/servers, etc.

In some embodiments, the method 400 may be implemented as part of a software program being executed on a computer, such as the computer 102, the server 152 running a kernel, etc. In some embodiments, the method 500 may be implemented by the computational application 140 being executed on the computer 102, a kernel of the computational application 140 being executed on the server 152, etc. In some embodiments, the method 500 may be implemented, at least partially, by the cloud-based development front end 144, the cloud-based development system 188, or a combination of the two.

At block 404, programmer input in a programming language is received, the programmer input including i) a function corresponding to making electronic objects accessible on a network, and ii) a parameter indicating an electronic object. For example, in an embodiment, a programmer enters the programming input via a user interface of or coupled to the computer 102. In some embodiments, the programmer input may be entered into a notebook, workspace, etc., of the computational application 140. In some embodiments, the function may be a built-in function of the programming language. In an embodiment, the function is the CloudDeploy function.

In various embodiments, the electronic object indicated by the parameter may include one or more of data, further programming input in the programming language or another programming language, data, a file, a document, an undeployed web page, etc.

In various embodiments, the programmer input includes one or more other parameter regarding how the object is to be deployed. For example, in various embodiments, the programmer input may include a further parameter indicating how the electronic object is to be evaluated by the server, a further parameter indicating to the server that the object input is to be evaluated by the server each time the electronic object is accessed, a further parameter indicating to the server that the object is to be evaluated by the server according to a schedule, a further parameter indicating to the server that the object is to be dynamically evaluated by the server, etc.

As another example, in various embodiments, the programmer input may include a further parameter indicating permission information for access to the object after deployment.

As another example, in various embodiments, the programmer input may include a further parameter indicating a location at which the object is to be deployed, such a handle to an already deployed object, a URI, etc.

At block 408, the programmer input is evaluated to cause the electronic object to be stored on a server and made accessible via a network coupled to the server. For example, in an embodiment, the programmer input is evaluated at the computer 102 by the computational application 140. As another example, in an embodiment, block 408 includes, additionally or alternatively, evaluating the programmer input at the server 152 by a server-side portion (e.g., a kernel, etc.) of the computational application 140.

In an embodiment, block 408 includes the computer 102, in response to evaluating the programmer input, sending a message to the server 152 via the network 150, the message requesting the server 152 to deploy the object in the cloud storage 180 and to make the object accessible via the network 150 (or another network coupled to the cloud storage 180). In various embodiments and/or scenarios, the message includes the object or an indicator of where the object may be obtained, such as a pointer to where the object is stored in a memory (e.g., the memory 108, the cloud storage 180, etc.), a URI corresponding to the object, etc.

In some embodiments and/or scenarios, the message may contain one or more further parameters such as a further parameter indicating how the electronic object is to be evaluated by the server, a further parameter indicating to the server that the object input is to be evaluated by the server each time the electronic object is accessed, a further parameter indicating to the server that the object is to be evaluated by the server according to a schedule, a further parameter indicating to the server that the object is to be dynamically evaluated by the server, etc. As another example, in some embodiments, the message may contain a further parameter indicating permission information for access to the object after deployment.

In an embodiment in which the programmer input is evaluated at the server 152, block 408 may include the server 152 extracting from the programmer input the object or an indicator of where the object may be obtained, such as a pointer to where the object is stored in a memory (e.g., the memory 108, the cloud storage 180, etc.), a URI corresponding to the object, etc. In an embodiment in which the programmer input is evaluated at the server 152, block 408 may include the server 152 extracting from the programmer input further parameters such as described above.

In response to evaluating the programmer input and/or receiving the message discussed above, the server 152 may store the object in the cloud storage 180 and make the object accessible via the network 150 (or another network), in various embodiments. In an embodiment, the server 152 may determine where in the cloud storage 180 the object is to be deployed. If provided in the message and/or the programmer input, the server 152 may utilize a parameter included in the programmer input that indicates a location at which the object is to be deployed, in an embodiment.

If provided in the message and/or the programmer input, the server 152 may utilize one or more parameters specifying how the object is to be deployed such as how often, when, etc., the object is to be evaluated when deployed, permission information for access to the object, etc., and may the server 152 may deploy the object according to the parameters.

At block 412, in response to evaluating the programmer input, a handle to the deployed electronic object is received, the handle to enable accessing the electronic object via the network. In various embodiments, the handle may comprise a pointer, a web page address, a Hypertext Transfer Protocol (HTTP) address, a URI, a universal resource locator (URL), etc. In an embodiment, the server 152 may send the handle to the computer 102 via the network 150. In an embodiment, the server 152 may include the handle in a subsequent message that is responsive to a message sent from the computer 102 to the server 152 that requested the server 152 to deploy the object in the cloud storage 180 and to make the object accessible via the network 150 (or another network).

In some embodiments, block 412 is omitted. For example, in some embodiments, the server may publish the handle, URI, URL, etc., to a repository (e.g., in the cloud storage 180 or another suitable location) where the handle, URI, URL, etc., can be retrieved.

Figure 5:
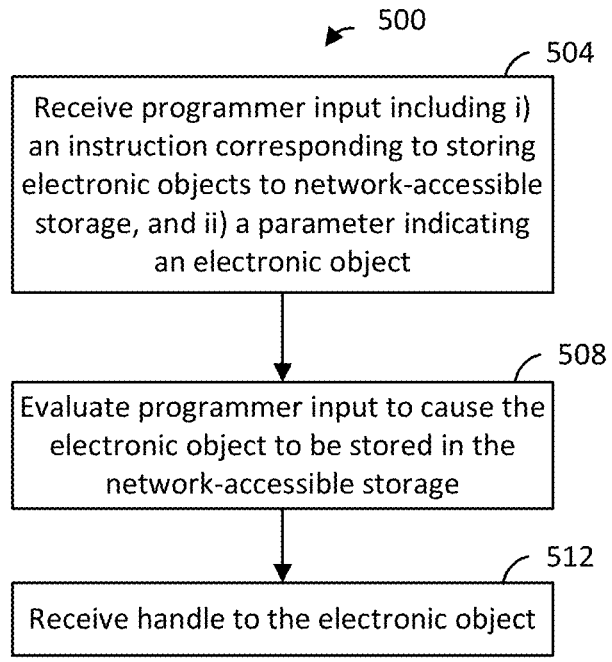
FIG. 5 is a flow diagram of an example method for storing an object to network-accessible storage, according to an embodiment.

FIG. 5 is a flow diagram of an example method 500 for storing objects to a cloud environment that enables accessing the objects via a network. In some embodiments, the method 500 may be implemented at one or more computers, such as the computer 102 and/or the server 152 of FIG. 1. Merely for explanatory purposes, FIG. 5 is described in the context of the method 500 implemented by the computer 102. In other embodiments, however, the method 500 may be implemented jointly at the computer 102 and the server 152, at another suitable computer (not shown in FIG. 1), at one or more other computers/servers, etc.

In some embodiments, the method 500 may be implemented as part of a software program being executed on a computer, such as the computer 102, the server 152 running a kernel, etc. In some embodiments, the method 500 may be implemented by the computational application 140 being executed on the computer 102, a kernel of the computational application 140 being executed on the server 152, etc. In some embodiments, the method 500 may be implemented, at least partially, by the cloud-based development front end 144, the cloud-based development system 188, or a combination of the two.

At block 504, programmer input in a programming language is received, the programmer input including i) a function corresponding to storing electronic objects to network-accessible storage, and ii) a parameter indicating an electronic object. For example, in an embodiment, a programmer enters the programming input via a user interface of or coupled to the computer 102. In some embodiments, the programmer input may be entered into a notebook, workspace, etc., of the computational application 140. In some embodiments, the function may be a built-in function of the programming language. In an embodiment, the function is the CloudPut function.

In various embodiments, the electronic object indicated by the parameter may include one or more of data, further programming input in the programming language or another programming language, data, a file, a document, an undeployed web page, etc.

In various embodiments, the programmer input includes one or more other parameters regarding storing of the object in the network-accessible storage. For example, in various embodiments, the programmer input may include a further parameter indicating a location at which the object is to be stored, such a handle to an already stored object, a URI, etc.

At block 508, the programmer input is evaluated to cause the electronic object to be stored in the network-accessible storage. For example, in an embodiment, the programmer input is evaluated at the computer 102 by the computational application 140. As another example, in an embodiment, block 508 includes, additionally or alternatively, evaluating the programmer input at the server 152 by a server-side portion (e.g., a kernel, etc.) of the computational application 140.

In an embodiment, block 508 includes the computer 102, in response to evaluating the programmer input, sending a message to the server 152 via the network 150, the message requesting the server 152 to store the object in the cloud storage 180. In various embodiments and/or scenarios, the message includes the object or an indicator of where the object may be obtained, such as a pointer to where the object is stored in a memory (e.g., the memory 108, the cloud storage 180, etc.), a URI corresponding to the object, etc.

In some embodiments and/or scenarios, the message may contain one or more further parameters regarding storage of the object in the network-accessible storage, such as a parameter indicating a location at which the object is to be stored, such a handle to an already stored object, a URI, etc.

In an embodiment in which the programmer input is evaluated at the server 152, block 508 may include the server 152 extracting from the programmer input the object or an indicator of where the object may be obtained, such as a pointer to where the object is stored in a memory (e.g., the memory 108, the cloud storage 180, etc.), a URI corresponding to the object, etc. In an embodiment in which the programmer input is evaluated at the server 152, block 508 may include the server 152 extracting from the programmer input further parameters such as described above.

In response to evaluating the programmer input and/or receiving the message discussed above, the server 152 may store the object in the cloud storage 180, in an embodiment. In an embodiment, the server 152 may determine where in the cloud storage 180 the object is to be stored. If provided in the message and/or the programmer input, the server 152 may utilize a parameter included in the programmer input that indicates a location at which the object is to be stored, in an embodiment.

At block 512, in response to evaluating the programmer input, a handle to the stored electronic object is received. The handle may enable accessing the electronic object via the network, in some embodiments. In various embodiments, the handle may comprise a pointer, a web page address, a Hypertext Transfer Protocol (HTTP) address, a URI, a universal resource locator (URL), etc. In an embodiment, the server 152 may send the handle to the computer 102 via the network 150. In an embodiment, the server 152 may include the handle in a subsequent message that is responsive to a message sent from the computer 102 to the server 152 that requested the server 152 to deploy the object in the cloud storage 180 and to make the object accessible via the network 150 (or another network).

In some embodiments, block 512 is omitted. For example, in some embodiments, the handle, URI, URL, etc., may be published to a repository (e.g., in the cloud storage 180 or another suitable location) where the handle, URI, URL, etc., can be retrieved.

Figure 6:
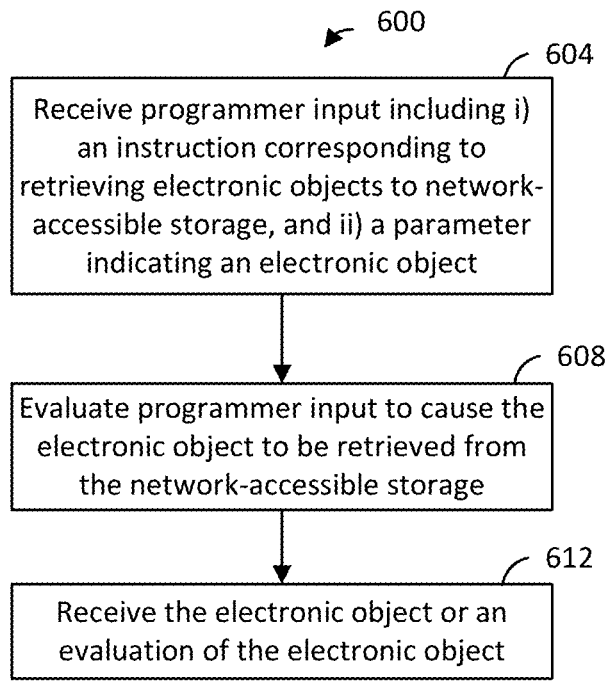
FIG. 6 is a flow diagram of an example method for retrieving an object from network-accessible storage, according to an embodiment.

FIG. 6 is a flow diagram of an example method 600 for retrieving objects from a cloud environment that enables accessing the objects via a network. In some embodiments, the method 600 may be implemented at one or more computers, such as the computer 102 and/or the server 152 of FIG. 1. Merely for explanatory purposes, FIG. 6 is described in the context of the method 600 implemented by the computer 102. In other embodiments, however, the method 600 may be implemented jointly at the computer 102 and the server 152, at another suitable computer (not shown in FIG. 1), at one or more other computers/servers, etc.

In some embodiments, the method 600 may be implemented as part of a software program being executed on a computer, such as the computer 102, the server 152 running a kernel, etc. In some embodiments, the method 600 may be implemented by the computational application 140 being executed on the computer 102, a kernel of the computational application 140 being executed on the server 152, etc. In some embodiments, the method 600 may be implemented, at least partially, by the cloud-based development front end 144, the cloud-based development system 188, or a combination of the two.

At block 604, programmer input in a programming language is received, the programmer input including i) a function corresponding to retrieving electronic objects from network-accessible storage, and ii) a parameter indicating an electronic object. For example, in an embodiment, a programmer enters the programming input via a user interface of or coupled to the computer 102. In some embodiments, the programmer input may be entered into a notebook, workspace, etc., of the computational application 140. In some embodiments, the function may be a built-in function of the programming language. In an embodiment, the function is the CloudGet function.

In various embodiments, the electronic object indicated by the parameter may include one or more of data, further programming input in the programming language or another programming language, data, a file, a document, a web page, etc.

In various embodiments, the programmer input includes one or more other parameters regarding retrieval of the object from the network-accessible storage. For example, in various embodiments, the programmer input may include a further parameter indicating a location at which the object is stored, such a handle to the object, a URI, etc.

At block 608, the programmer input is evaluated to cause the electronic object to be retrieved from the network-accessible storage. For example, in an embodiment, the programmer input is evaluated at the computer 102 by the computational application 140. As another example, in an embodiment, block 608 includes, additionally or alternatively, evaluating the programmer input at the server 152 by a server-side portion (e.g., a kernel, etc.) of the computational application 140.

In an embodiment, block 608 includes the computer 102, in response to evaluating the programmer input, sending a message to the server 152 via the network 150, the message requesting the server 152 to retrieve the object from the cloud storage 180. In some embodiments and/or scenarios, the message may contain one or more a parameter regarding retrieval of the object from the network-accessible storage, such as a parameter indicating a location at which the object is stored, such a handle to an already stored object, a URI, etc.

In an embodiment in which the programmer input is evaluated at the server 152, block 608 may include the server 152 extracting from the programmer input a parameter indicating from where in the storage 180 the object may be obtained, such as a pointer to where the object is stored in the cloud storage 180, a URI corresponding to the object, etc.

In response to evaluating the programmer input and/or receiving the message discussed above, the server 152 may retrieve the object from the cloud storage 180, in an embodiment. In an embodiment, the server 152 may determine where in the cloud storage 180 the object is stored. In some embodiments, the server 152 may also evaluate the object. For example, if the object comprises an expression and/or software code in the language of the computation application 140, the server 152 may (e.g., using a kernel of the computational application 140) evaluate the expression and/or the software code.

At block 612, in response to evaluating the programmer input, the retrieved object, or an evaluation of the retrieved object, is received, according to various embodiments. In an embodiment, the server 152 may send the object (or the evaluation of the object) to the computer 102 via the network 150. In an embodiment, the server 152 may include the object (or the evaluation of the object) in one or more subsequent messages that are responsive to a message sent from the computer 102 to the server 152 that requested the server 152 to retrieve the object from the cloud storage 180.

In some embodiments, messaging such as discussed above with respect to FIGS. 4-6 is not utilized.

In some embodiments, cloud objects may be utilized by the computational application 140 running at the computer 102. In some embodiments, a CloudSave function is provided for saving definitions associated with a symbol to a cloud object. For instance, in an embodiment, the CloudSave function enables a programmer to save symbol definitions to the cloud. For example, in various embodiments, one or more of the following syntaxes are utilized:

CloudSave[symbol]

In this example, definitions associated with the specified symbol are saved to a new anonymous cloud object, and the server 152 assigns URI to the cloud object. Evaluation of this function returns a handle to the object. The cloud object can then be accessed using the handle.

CloudSave["form"]

In this example, definitions associated with symbols whose name match the string pattern "form" are saved to the cloud.

CloudSave["context"]

In this example, definitions associated with symbols in the specified context are saved to the cloud.

CloudSave[{$object_1$, $object_2$, . . . }]

In this example, definitions associated with several objects are saved to the cloud.

CloudSave[symspec,"uri"]

In this example, definitions associated with symspec are saved to the cloud object at a given URI.

CloudSave[symspec, CloudObject["uri"]]

In this example, definitions associated with symspec are saved to a specified cloud object.

As an illustrative example, a user may enter "f[x_]:=x^2" in a notebook to define a function f as the square of x. The user may then save the function to the cloud, e.g., by entering "obj=CloudSave[f]. If f is later modified in the notebook, the user can restore the function f by entering CloudGet[obj]. Then, if the user were to enter "f[2]", the computational application would return "4", i.e., the square of two.

In some embodiments, a CloudSymbol object may represent a symbol whose value is persistently stored in the cloud. For instance, in an embodiment, the CloudSymbol function enables a programmer to persistently save symbols to the cloud. For example, in various embodiments, one or more of the following syntaxes are utilized:

CloudSymbol["name"]

In this example, a named symbol is persistently stored in the cloud.

CloudSymbol[obj]

In this example, a persistent symbol corresponding to the cloud object "obj" is represented.

As an illustrative example, a user may enter "CloudSymbol["x"]=!10" in a notebook. Upon evaluation, a cloud symbol "x" with a value set to !10 is stored in the cloud storage 180. Later, if the user utilizes the object CloudSymbol["x"] in the notebook or another notebook, the computational application 140 will retrieve the value of the object, e.g., !10, or 3628800.

In some embodiments, a CloudFunction is provided for having functions evaluated in the cloud (e.g., by the server 152). For instance, in an embodiment, the CloudFunction enables a programmer to have specified functions evaluated in the cloud rather than on the computer 102. For example, in various embodiments, one or more of the following syntaxes are utilized:

CloudFunction[func]

In this example, a function "func[args]" is evaluated in the cloud. Evaluation of this function returns a result of the evaluation of func[args].

CloudFunction[CloudObject[ . . . ]]

In this example, a function applies the contents of a specified cloud object.

As an illustrative example, a user may enter "CloudFunction[#1+#2 &][3, 4]" in a notebook. Upon evaluation in the cloud, a result "7" is returned. As another example, a user may enter "func=CloudPut[Factorinteger[#] &]. Upon evaluation, a cloud object "func" is returned. Then, if the user entered CloudFunction[func][42]" in the notebook, a result {{2, 1}, {3, 1}, {7, 1}} is returned.

In some embodiments, a CloudEvaluate function is provided for having expressions evaluated in the cloud (e.g., by the server 152). For instance, in an embodiment, the CloudEvaluate function enables a programmer to have specified expressions evaluated in the cloud rather than on the computer 102. An example syntax may be:

CloudEvaluate[expr]

In this example, a specified expression is evaluated in the cloud. Evaluation of the expression returns a result of the evaluation.

As an illustrative example, a user may enter "CloudEvaluate[$MachineID]" in a notebook run on the computer 102. Upon evaluation in the cloud, a unique identifier of a machine (e.g., server 152) that evaluated the object "MachineID" is returned, which is not the unique identifier of the computer 102.

In some embodiments, web sites and other server-based applications and/or systems can manipulate data and/or execute/evaluate functions and methods stored on the cloud storage 180. For example, software executing on a different server may call functions stored on the cloud storage 180 (perhaps specifying parameters associated with the function), the server 152 may evaluate the functions, and the server 152 may transmit the results back to the different server. This may allow the different server to offload processing to the cloud platform. Additionally, the different server may use the techniques, systems, and/or example functions discussed above to store to and/or retrieve from the cloud platform data, variables, objects, etc. as part of the server/website functionality.

As one example of the utility of such an arrangement, a user at a desktop computer may be running software on the desktop computer that stores resulting data to the cloud (e.g., using the CloudPut function, the CloudSave function, etc.). A function or method executing on the cloud platform may be manipulating or analyzing the saved result data (e.g., classifying it, formatting it, performing additional analysis, etc.). At the same time, a web server may be providing the manipulated or analyzed data to a user or to a function (e.g., a JAVA function) executing on the web site. The web server may use the CloudGet function to retrieve the data from the cloud platform, which will be the most recent data saved to the cloud platform, according to some embodiments.

Similarly, programs running locally on a desktop computer, mobile device, or the like, can call functions stored in/on the cloud platform. The cloud platform can execute the functions and provide results to the calling program, thereby augmenting the processing power of the desktop computer, mobile device, etc. with the superior processing power of the cloud platform (or at least decreasing the processing load on the desktop computer, mobile device, etc.).

Similarly, data, objects, variables, functions, methods, etc. stored on the cloud platform can be retrieved and used in local processor tasks on a desktop computer, mobile device, and the like. The results of the local processor tasks may be saved locally and/or back to the cloud platform.

Forms Generation

Referring again to FIG. 1, the system 100 may facilitate efficient generation of electronic forms for eliciting user information (and processing that information, in some embodiments), and deployment of such forms to the web, according to some embodiments. For example, the cloud-based development system 188 and/or the cloud-based development front end 144 may include a forms generation module that enables efficient and flexible generation of electronic forms. Embodiments of a forms generation module and techniques for generating forms are discussed below. In some embodiments, such modules and techniques may be implemented by the system 100 of FIG. 1. In other embodiments, such modules and techniques may be implemented by systems different than the system of FIG. 1.

Figure 7:
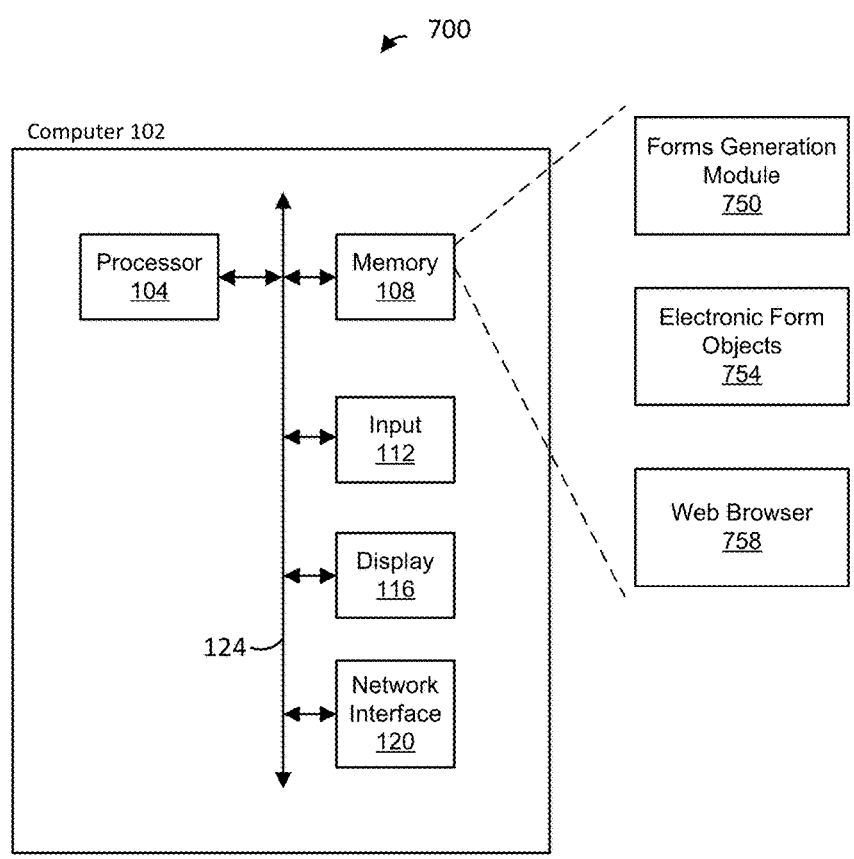
FIG. 7 is a diagram of an example system for generating electronic forms, according to an embodiment.

FIG. 7 is a diagram of an example system 700 for creating electronic forms for eliciting user information, according to an embodiment. As described in more detail below, the system 700 enables efficient and flexible generation of electronic forms, according to some embodiments.

In an embodiment, the system 700 includes a computer similarly structured to the computer 102 of FIG. 1. For purposes of brevity, like-numbered components are not described in detail.

In an embodiment, the memory 108 may store a forms generation module 750 that facilitates generation of electronic forms, as will be described in more detail below. In an embodiment, the forms generation module 750 comprises software instructions that, when executed by the processor 104, causes the processor to evaluate programming input from a programmer to generate an electronic form object. As an illustrative example, the electronic form object is generated i) to include HyperText Markup Language (HTML) elements and ii) such that a web browser can generate a web page form from the electronic form object, according to a specific embodiment. In other embodiments, the electronic form object is generated to include Extensible Hypertext Markup Language (XHTML) elements, Extensible Markup Language (XML) elements, style sheets (e.g., Cascading Style Sheets (CSS)), scripts (e.g., JAVASCRIPT®, etc.), and such that a suitable application (e.g., a web browser, a web browser with an appropriate plug in, etc.) can generate a suitable electronic form (e.g., a web page form) from the electronic form object.

As another example, the electronic form object is generated i) to include Computable Document Format (CDF) code, and ii) such that a CDF player (available from Wolfram Research, Inc.) can generate an electronic form from the electronic form object, according to an embodiment.

As another example, the electronic form object is generated i) to include a spreadsheet application macro, and ii) such that the spreadsheet application can render the electronic form, e.g., using spreadsheet elements.

In some embodiments, the electronic form object is generated such that a computational application (e.g., MATHEMATICA® or another suitable application) prompts the user to provide input via one or more command line prompts. In some embodiments, electronic form object is generated such that a suitable application (e.g., having or utilizing voice synthesizer technology and/or voice recognition technology) prompts the user with audio prompts to provide voice input. Thus, in some embodiments, the electronic form need not be displayed on a display device and/or need not utilize graphical user interface (GUI) elements.

In some embodiments, generated electronic form objects 754 are stored in the memory 108.

In some embodiments, the forms generation module 750 is a component of a compiler, i.e., a computer program that transforms source code written in a programming language into another computer language, typically to create an executable program. In some embodiments, the forms generation module 750 is a component of an interpreter, i.e., a computer program that directly executes, i.e. performs, instructions written in a programming or scripting language (referred to herein for brevity as a "programming language"), without first compiling the instructions into a machine language program. Thus, in some embodiments, the programming input evaluated by the forms generation module 750 includes software instructions written in a programming language.

In some embodiments, the forms generation module 750 is a component of a software application such as a computational application. For example, the forms generation module 750 may be a component of the MATHEMATICA® computational software program developed by Wolfram Research, Inc., according to a specific embodiment.

In an embodiment, the memory 108 may store a web browser 758. In an embodiment, the web browser 758, when executed by the processor 104, can generate web page forms from at least some electronic form objects 754, according to an embodiment. For example, in an embodiment, the web browser 758 is utilized by a programmer for visualizing, adjusting, modifying, etc., electronic forms generated using the forms generation module 750.

Figure 8:
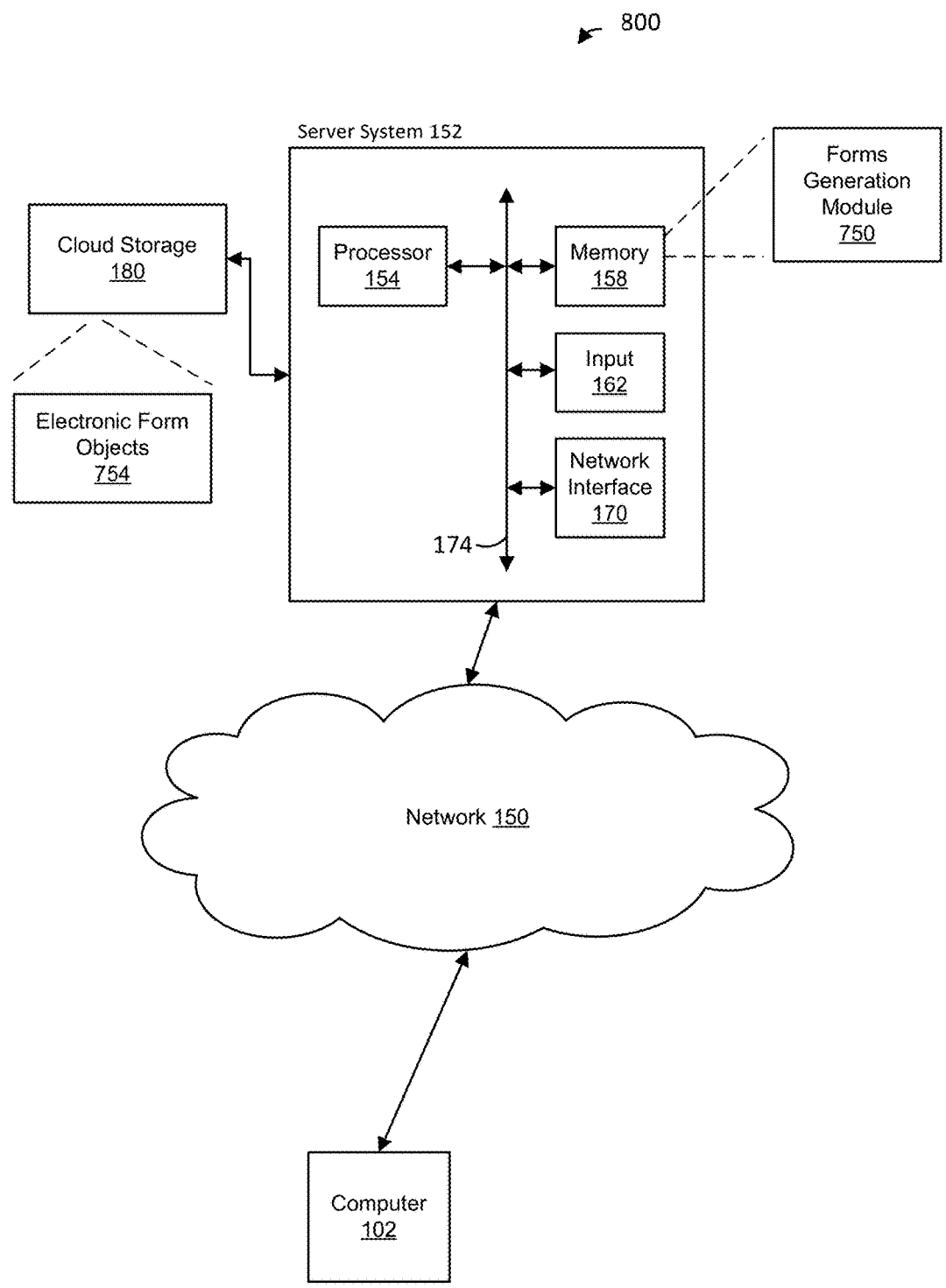
FIG. 8 is a diagram of another example system for generating electronic forms, according to another embodiment.

FIG. 8 is a diagram of another example system 800 for creating electronic forms for eliciting user information, according to another embodiment. As described in more detail below, the system 800 enables efficient and flexible generation of electronic forms, according to some embodiments. In an embodiment, the system 800 is similarly structured to the system 100 of FIG. 1. For purposes of brevity, like-numbered components are not described in detail.

In an embodiment, the memory 158 may store some of or the entire forms generation module 750 discussed above. For example, in an embodiment, the forms generation module 750 is implemented as a client-server system, and the memory 158 stores a server portion of the forms generation module 750, whereas the memory 108 of the computer 102 stores a client portion of the forms generation module 750. In an embodiment, a programmer uses the computer 102 to provide programming input to the server 152 via the network 150. The server 152 then generates an electronic form object, and the electronic form object is stored in a memory. For example, in an embodiment, the electronic form object is stored in the memory 158 and/or the cloud storage 180. In some embodiments, the cloud storage 180 is omitted. In another embodiment, the electronic form object is transmitted to the computer 102, via the network 150, and is stored in the memory 108. In another embodiment, the electronic form object is stored in a memory of another server system (e.g., a web server (not shown)) so that the electronic form object is accessible via the Internet, for example.

Figure 9:
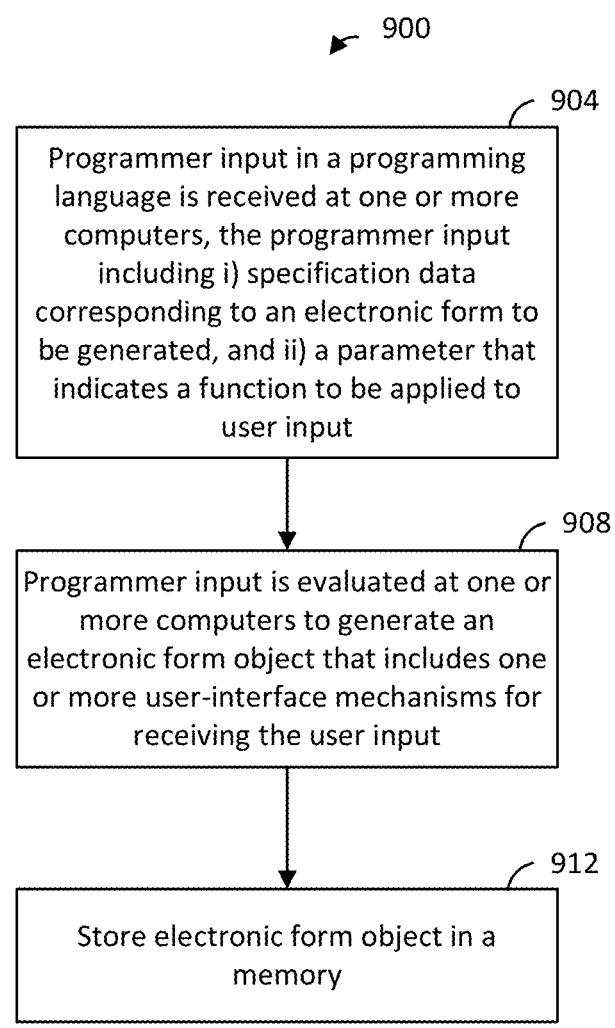
FIG. 9 is a flow diagram of an example method for generating electronic forms, according to an embodiment.

FIG. 9 is a flow diagram of an example method 900 for generating an electronic form, according to an embodiment. The method 900 may be implemented by the system 100 of FIG. 1, the computer 102 of FIG. 7, and/or the system 800 of FIG. 8, in some embodiments, and the method 900 is discussed with reference to FIGS. 7 and 8 for explanatory purposes. In other embodiments, however, the method 900 is implemented by a suitable computer or a suitable system (e.g., multiple computers) other than the system 100, the computer 102 and/or the system 800.

At block 904, programmer input in a programming language is received at one or more computers. For example, programmer input is received, via one or more input devices 112, at the computer 102. In some embodiments, the computer 102 transmits the programmer input to the server 152 via the network 150, and thus the programmer input is received at the server 152. The programmer input includes i) specification data corresponding to an electronic form to be generated, and ii) a parameter that indicates a function to be applied to user input.

Figures 10A, 10B:
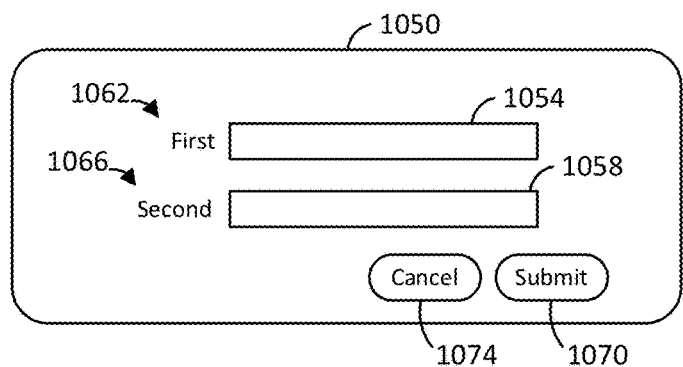
FIG. 10A is an example of programming input that may be utilized to generate an electronic form, according to an embodiment.
FIG. 10B is an illustration of an electronic form generated in response to the programming input of FIG. 10A, according to an embodiment.

FIG. 10A illustrates an example of programmer input 1000 such as programmer input that can be received at block 904, according to an illustrative embodiment. The programmer input 1000 includes built-in function 1004 of a programming language, i.e. FormFunction[ ], that a programmer may utilize to efficiently create an electronic form. The built-in function 1004 includes two arguments: specification data 1008 and a parameter 1012 that indicates a function to be applied to user input. Generally, specification data such as the specification data 1008 may include data to indicate properties of the form to be generated, according to an embodiment. For example, the specification data 1008 includes data to indicate that the form is to elicit two inputs: "first" and "second". Additionally, the specification data 1008 indicate that the "first" input will be of a data type "String", and the "second" will be of a data type "Number".

Referring again to FIG. 9, at block 908, the programmer input is evaluated at one or more computers to generate an electronic form object that includes one or more user-interface mechanisms for receiving the user input. For example, the forms generation module 750 may evaluate the programmer input, in an embodiment. In some embodiments, the programmer input is fully evaluated in response to receiving the programmer input. In other embodiments, however, the programmer input is only partially evaluated, and full evaluation is not completed until a later time, such as upon or just before cloud deployment of the electronic form object, or upon or just before the function indicated by the parameter 1012 is to be applied in response to user input.

Block 908 may include evaluating the programmer input to generate code that is capable of being processed by an application (e.g., a web browser or another suitable application) to render the electronic form such as on a display device.

Block 908 may include evaluating the specification data to determine general characteristics of the form to be generated, according to an embodiment. For example, in some embodiments, determining general characteristics of the form to be generated may include determining one or more of i) how many user inputs are to be received by the form, ii) respective data types of the user inputs, etc. Referring to FIG. 10A, for example, the specification data 1008 is evaluated to determine that the form is to elicit two elicit two inputs: "first" and "second". Additionally, evaluation of the specification data 1008 reveals that the "first" input will be of a data type "String", and the "second" will be of a data type "Number". Thus, in an illustrative embodiment, the forms generation module 750 evaluates the specification data 1008 to determine that the form requires two inputs: one to elicit user input of data type "String", and another to elicit user input of data type "Number". Based on the evaluation of the specification data, code is generated for an electronic form that conforms to the general characteristics corresponding to the specification data 1008. The generated code is capable of being processed by an application to render the electronic form (having the general characteristics).

Also, block 908 may include evaluating the parameter that indicates the function to generate code in the electronic form object, in some embodiments. In the illustrative example of FIG. 10A, the indicated function is merely "f". In other embodiments and/or scenarios, the indicated function may be a function expressed as or using built-in functions of the programming language and/or programming statements expressed using the programming language. Thus, evaluating the parameter 1012 may comprise evaluating one or more built-in functions of the programming language and/or one or more programming statements expressed using the programming language, in some embodiments. Based on the evaluation of the parameter, code is generated for the electronic form to cause the function to be applied to input data when the electronic form is utilized by a user. In some embodiment, the generated code is capable of being processed by the application that is to render the electronic form.

In other embodiments, however, the parameter 1012 that indicates the function may be evaluated at a later time, such as upon or just before cloud deployment of the electronic form object, or upon or just before the function indicated by the parameter 1012 is to be applied in response to user input. Thus, in some embodiments, the generated code causes evaluation of the function to be completed at "run-time", e.g., after user input is received.

In some embodiments, block 908 includes generating the electronic form object to include one or more of HTML elements, XHTML elements, XML elements, style sheets (e.g., CSS), scripts (e.g., JAVASCRIPT®, etc.), CDF code, a spreadsheet macro, etc. In some embodiments, block 908 includes generating the electronic form object such that the electronic form object can be rendered by a web browser, a web browser with a suitable plugin, a CDF player, a spreadsheet application, an application that utilizes command line prompts, an application that utilizes audio prompt technology (e.g., voice synthesizer technology) and/or voice recognition technology, etc. Thus, in some embodiments, the electronic form need not be generated so that it can be rendered on a display device and/or such that it utilizes GUI elements. For example, the electronic form may be generated to utilize command line prompts, receive input via a command line, utilize audio prompts, receive audio input (e.g., voice input), etc.

In some embodiments, the computer 102 implements block 908. In some embodiments, the server system 202 implements block 908. In some embodiments, the computer 102 and the server system 202 together implement block 908.

At block 912, the electronic form object generated at block 908 is stored in a memory. For example, in an embodiment, the electronic form object is stored in the memory 108. In another embodiment, the electronic form object is stored in the memory 208. In another embodiment, the electronic form object is stored in some other suitable memory such as a memory of a web server (not shown in FIGS. 7 and 8).

As discussed above, a suitable application may render an electronic form using the electronic form object. FIG. 10B is an illustration of an example graphical electronic form 1050 that may be rendered based on an electronic form object generated in response to the programming input of FIG. 10A, according to an embodiment. The electronic form 1050 includes a first GUI mechanism 1054 and a second GUI mechanism 1058 corresponding to the "first" input and the "second" input, respectively, discussed above with respect to FIG. 10A. The first GUI mechanism 1054 is a first text box and the second GUI mechanism is a second text box. In an embodiment, the forms generation module 750 generates the electronic form object such that the electronic form 1050 includes text boxes in response to the specification data 1008 indicating that the first input is of data type string and the second input is of data type number because text boxes are appropriate GUI mechanisms for eliciting string and number data types, in an embodiment.

The electronic form 1050 includes a first label 1062 for the first text box 1054, and includes a second label 1066 for the second text box 1058. The forms generation module 750 generates the electronic form object such that the electronic form 1050 includes the first label 1062 and the second label 1066 in response to the specification data 1008, in an embodiment.

The electronic form 1050 includes a submit button 1070. The forms generation module 750 generates the electronic form object such that the electronic form 1050 includes the submit button 1070 because utilizing a submit button is appropriate when utilizing text boxes, in an embodiment. The electronic form 1050 also includes a cancel button 1074. The forms generation module 750 generates the electronic form object such that the electronic form 1050 includes the cancel button 1074 as a default, according to an embodiment.

When the user enters a string in the text box 1054, enters a number in the text box 484, and then selects the submit button 1070, the electronic form object is configured to apply the function "f" 1012 to the string in the text box 1054 and the number in the text box 484 to generate a result. As discussed above, in some embodiments, the function "f" 1012 is evaluated when the user selects the submit button 1070.

In an embodiment, the forms generation module 750 automatically generates the electronic form object to take a certain action(s) when one or more user inputs do not match data types specified by the specification data 1008. For example, in an embodiment, the forms generation module 750 generates the electronic form object such that the user is prompted when one or more user inputs do not match data types specified by the specification data 1008. As an illustrative example, in an embodiment, if the user enters input other than a string in the text box 1054 and then selects the submit button 1070, the electronic form object may indicate to the user that the "first" input must be a string. Similarly, in an embodiment, if the user enters input other than a number in the text box 1058 and then selects the submit button 1070, the electronic form object may indicate to the user that the "second" input must be a number. Similarly, in an embodiment, if the user leaves one or more of the text box 1054 or the text box 1058 empty when selecting the submit button 1070, the electronic form object may indicate to the user that an input must be provided. For example, the electronic form object may display to the user a suitable message such as "This field is required." In some embodiments, specification data can be utilize to indicate that certain inputs are required, certain inputs are optional, certain inputs may have default values, etc.

In an embodiment, the programming language is designed so that the programmer can utilize the specification data, optionally, to specify various desired characteristics of the electronic form such as appearance characteristics, audio characteristics, timing characteristics, etc. In some embodiments, the forms generation module 750 utilizes default parameters when the specification data does not specify corresponding characteristics. For example, the programmer can utilize the specification data to specify a window size of a GUI form, but if the programmer does not specify a window size, the forms generation module 750 utilizes default parameters regarding the window size. As another example, the programmer can utilize the specification data to specify a color and/or design theme for a GUI form, but if the programmer does not specify a theme from a plurality of predetermined themes, the forms generation module 750 utilizes default parameters regarding the theme. As yet another example involving a form that uses audio prompts, the programmer can utilize the specification data to specify audio characteristics of the form (e.g., male or female voice for prompts, speaking speed of voice, volume, etc.), but if the programmer does not specify such audio characteristics, the forms generation module 750 utilizes default parameters regarding the audio characteristics.

In an embodiment, the programming language is designed so that the programmer can utilize the specification data, optionally, to specify various desired characteristics relating to output of results, but the forms generation module 750 utilizes default parameters when the specification data does not specify corresponding characteristics. For example, with GUI forms, the programmer can utilize the specification data to specify where, in relation to the GUI form, the result is to be displayed (e.g., below, above, to the right, to the left, etc.), but if the programmer does not specify such characteristics, the forms generation module 750 utilizes default parameters regarding placement of the result relative to the GUI form. As another example, when the result is to be output using audio, the programmer can utilize the specification data to specify audio characteristics corresponding to output of the result (e.g., male or female voice speaking speed of voice, volume, etc.), but if the programmer does not specify such characteristics, the forms generation module 750 utilizes default parameters regarding such audio characteristics.

In an embodiment, the programming language is designed so that the programmer can utilize the specification data, optionally, to specify a type of electronic form object to be generated, but the forms generation module 750 utilizes default parameters when the specification data does not specify corresponding characteristics. For example, the programmer can utilize the specification data to specify between a plurality of different types of objects such as two or more of web page code (e.g., HTML, XHTML, etc.), XML, a script (e.g., JAVASCRIPT®, etc.), CDF code, a spreadsheet macro, etc., but if the programmer does not specify such characteristics, the forms generation module 750 utilizes default parameters regarding the type of electronic object to be generated.

Figures 11A, 11B:
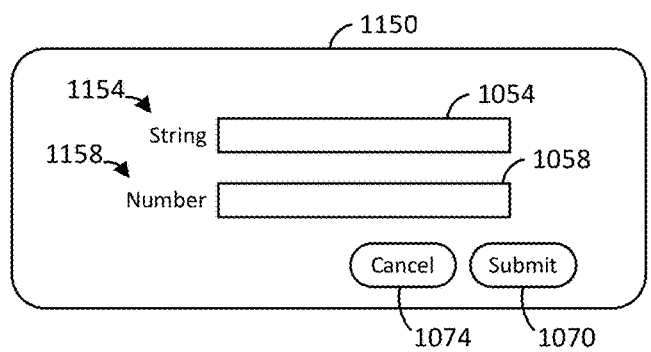
FIG. 11A is an example of programming input that may be utilized to generate an electronic form, according to an embodiment.
FIG. 11B is an illustration of an electronic form generated in response to the programming input of FIG. 11A, according to an embodiment.

Referring again to FIGS. 10A and 10B, the forms generation module 750, as a default, generates the electronic form object such that the form 1050 displays labels 1062 and 1066 as the keys "first" and "second". In some embodiments, the programmer can utilize the specification data to override this default and specify different labels to be included in the form. For example, FIGS. 11A and 11B illustrate the example programming input of FIG. 10A and the graphical electronic form of FIG. 10B, respectively, except that the specification data 1008 is altered to specify labels to be used in the form 1150. For example, the programming input 1100 includes {"first", "String"} to indicate that the text box 1054 (associated with the "first" input) should have a label "String" 1154, and also includes {"second", "Number"} to indicate that the text box 1058 (associated with the "second" input) should have a label "Number" 1158.

Figures 12A, 12B:
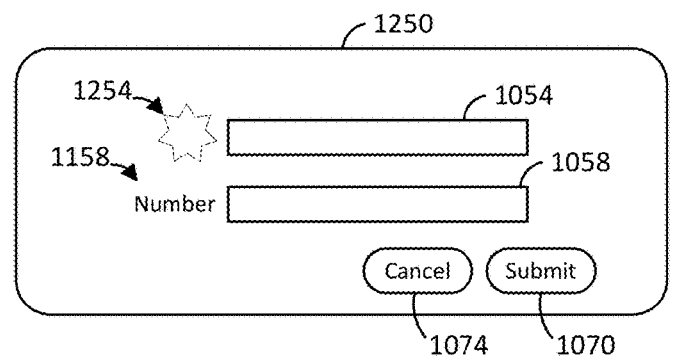
FIG. 12A is an example of programming input that may be utilized to generate an electronic form, according to an embodiment.
FIG. 12B is an illustration of an electronic form generated in response to the programming input of FIG. 12A, according to an embodiment.

In an embodiment, the programming language is designed to allow a programmer to specify labels as graphical objects. FIGS. 12A and 12B illustrate the example programming input of FIG. 11A and the graphical electronic form of FIG. 11B, respectively, except that the specification data 1008 is altered to specify labels to be used in the form 1250. For example, the programming input 1200 includes data related to the string input that indicates that the text box 1054 should have a graphical object 1204 as a label. Thus, the form 1250 is generated to display the corresponding label 1254. In the embodiment corresponding to FIGS. 12A and 12B, the programming input 1200 includes the graphical object 1204. In other embodiments, however, the programming input 1200 includes an indicator of or pointer to the graphical object 1204, such as a file name of the graphical object 1204.

Figure 13A:
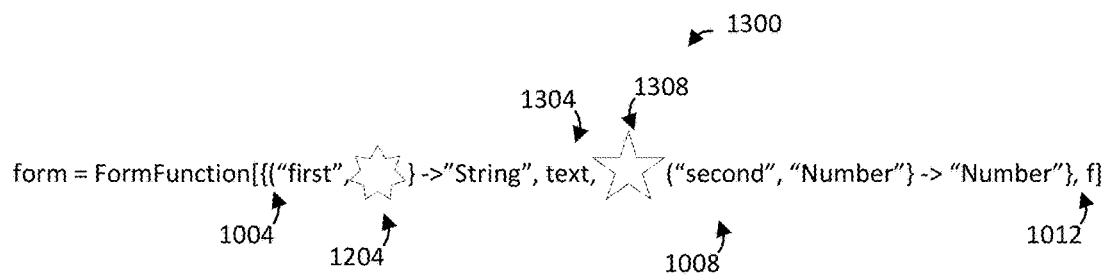
FIG. 13A is an example of programming input that may be utilized to generate an electronic form, according to an embodiment.
Figure 13B:
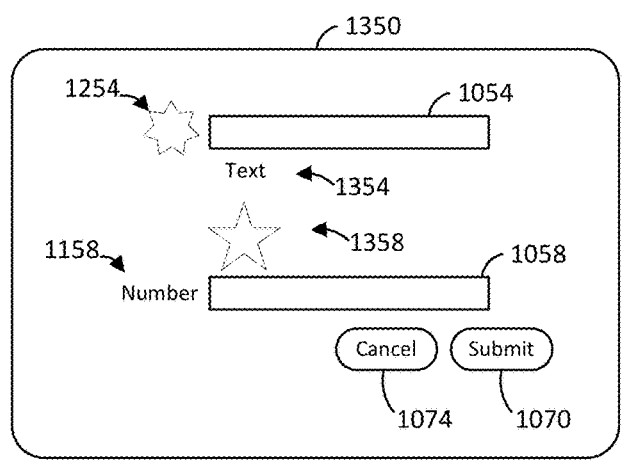
FIG. 13B is an illustration of an electronic form generated in response to the programming input of FIG. 13A, according to an embodiment.

In an embodiment, the programming language is designed to allow a programmer to add text and/or graphics to forms. FIGS. 13A and 13B illustrate the example programming input of FIG. 12A and the graphical electronic form of FIG. 12B, respectively, except that the specification data 1008 is altered to specify text and graphics to be included in a form 1350. For example, the programming input 1300 includes text 1304 and graphics 1308. Thus, the form 1350 is generated to display corresponding text 1354 and graphics 1358. In the embodiment corresponding to FIGS. 13A and 13B, the programming input 1300 includes the graphical object 1308. In other embodiments, however, the programming input 1300 includes an indicator of or pointer to the graphical object 1308, such as a file name of the graphical object 1308.

Figures 14A, 14B:
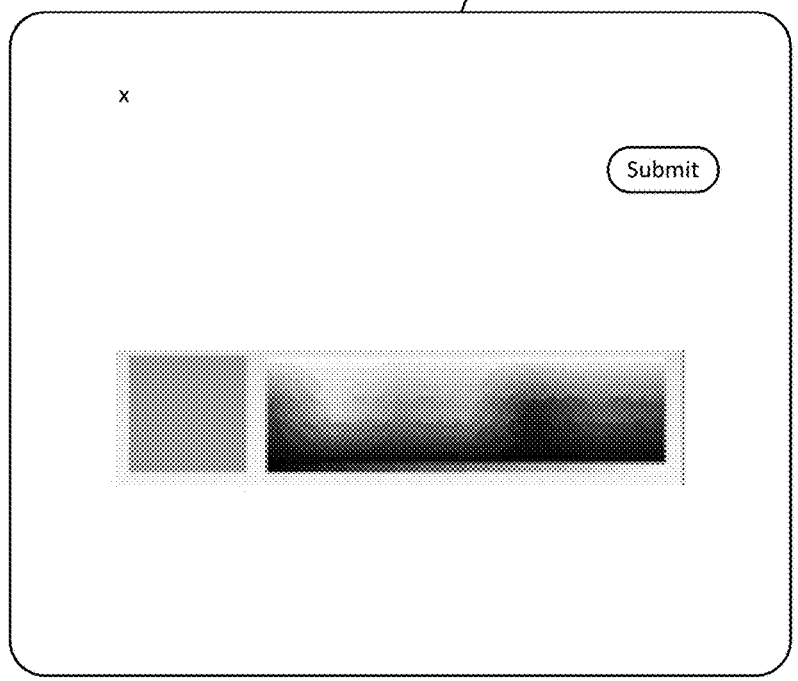
FIG. 14A is an example of programming input that may be utilized to generate an electronic form, according to an embodiment.
FIG. 14B is an illustration of an electronic form generated in response to the programming input of FIG. 14A, according to an embodiment.

As discussed above, in some embodiments the form generation module 750 is configured to automatically generate forms with user interface mechanisms appropriate for the type of input specified. FIG. 14A illustrates an example programming input 1400 in which a programmer has specified an input of type "Color". In response, the form generation module 750 generates an electronic form object that includes a GUI appropriate for selecting a color. For example, FIG. 14B illustrates an example form 1450 corresponding to an electronic form object generated by the form generation module 750. The form 1450 includes a GUI 854 for selecting a color.

Figure 15A:
FIG. 15A is an example of programming input that may be utilized to generate an electronic form, according to an embodiment.
Figure 15B:
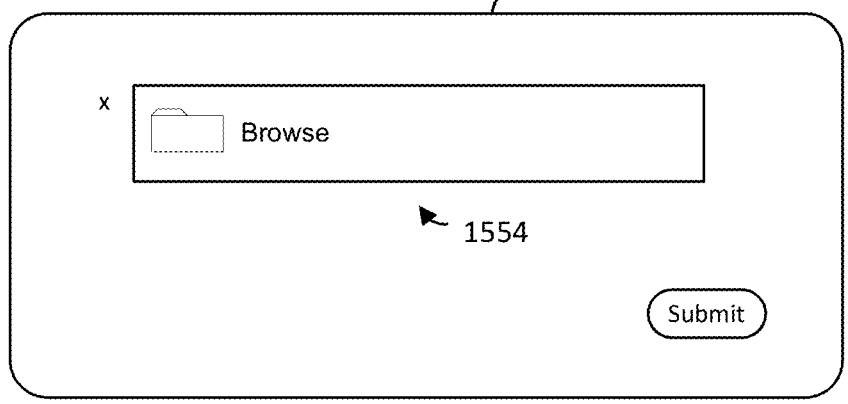
FIG. 15B is an illustration of an electronic form generated in response to the programming input of FIG. 15A, according to an embodiment.

FIG. 15A illustrates an example programming input 1500 in which a programmer has specified an input of type "image". In response, the form generation module 750 generates an electronic form object that includes a GUI appropriate for selecting an image file. For example, FIG. 15B illustrates an example form 1550 corresponding to an electronic form object generated by the form generation module 750. The form 1550 includes a GUI 1554 for selecting an image file.

Figures 16A, 16B:
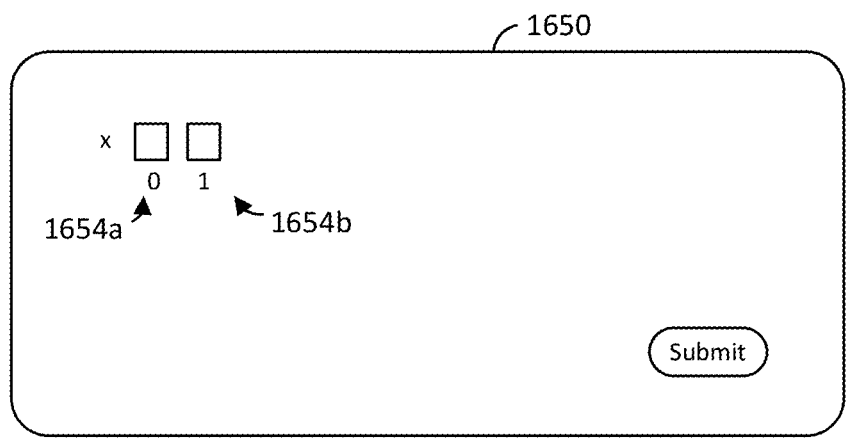
FIG. 16A is an example of programming input that may be utilized to generate an electronic form, according to an embodiment.
FIG. 16B is an illustration of an electronic form generated in response to the programming input of FIG. 16A, according to an embodiment.

FIG. 16A illustrates an example programming input 1600 in which a programmer has specified an input of type "Boolean". In response, the form generation module 750 generates an electronic form object that includes a GUI appropriate for selecting a Boolean value. For example, FIG. 16B illustrates an example form 1650 corresponding to an electronic form object generated by the form generation module 750. The form 1650 includes checkboxes 1654 for selecting either a Boolean value 0 or a Boolean value 1.

Figures 17A, 17B:
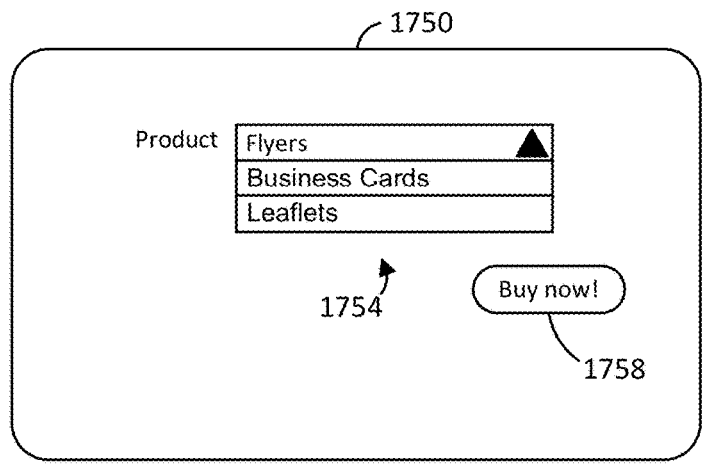
FIG. 17A is an example of programming input that may be utilized to generate an electronic form, according to an embodiment.
FIG. 17B is an illustration of an electronic form generated in response to the programming input of FIG. 17A, according to an embodiment.

FIG. 17A illustrates an example programming input 1700 in which a programmer has specified an input corresponding to selection of an element from a list. For example, the programming input 1700 includes specification data 1708 having code 1712 indicating a user input corresponding to selection from a list, e.g., from a list consisting of Flyers, Business cards, and Leaflets. In response, the form generation module 750 generates an electronic form object that includes a GUI appropriate for selecting from an element in a list. For example, FIG. 16B illustrates an example form 1750 corresponding to an electronic form object generated by the form generation module 750. The form 1750 includes a pull down menu 1754 for selecting an item from a list, e.g., the list consisting of Flyers, Business cards, and Leaflets.

Additionally, the specification data 1708 includes code 1716 indicating an override of the default label for the "Submit" button, e.g., "Buy now!" In response, the form generation module 750 generates the electronic form object such that a label 1758 for the resulting form 1750 has the label "Buy now!"

Figure 18A:
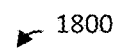
FIGS. 18A-C are examples of programming input that may be utilized to generate electronic forms, according to some embodiments.
Figure 18B:
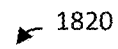
Figure 18C:
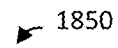

FIG. 18A illustrates an example programming input 1800 in which a programmer has specified a theme of "Red". In response, the form generation module 750 generates an electronic form object corresponding to an electronic form having a visual theme corresponding to "Red". Similarly, FIG. 18B illustrates an example programming input 1820 in which a programmer has specified a theme of "White". In response, the form generation module 750 generates an electronic form object corresponding to an electronic form having a visual theme corresponding to "White". FIG. 18C illustrates an example programming input 1850 in which a programmer has specified a theme of "Blue". In response, the form generation module 750 generates an electronic form object corresponding to an electronic form having a visual theme corresponding to "Blue".

Figures 19A, 19B:
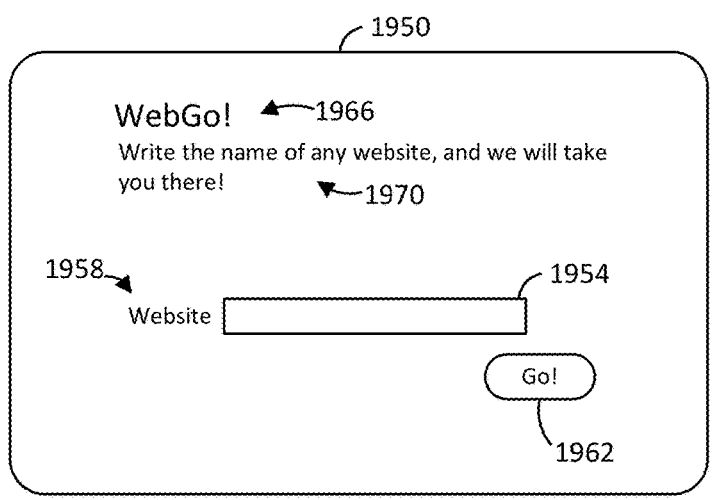
FIG. 19A is an example of programming input that may be utilized to generate an electronic form, according to an embodiment.
FIG. 19B is an illustration of an electronic form generated in response to the programming input of FIG. 19A, according to an embodiment.

FIG. 19A is an example of programming input 1900, and FIG. 19B is an illustration of an example graphical electronic form 1950 that may be rendered based on an electronic form object generated in response to the programming input 1900 of FIG. 19A, according to an embodiment. The programming input 1900 includes specification data 1908 having data 1912 that indicates a first function to be applied to user input received via the form. In particular, the first function 1912 specifies that a "SemanticURL" type interpreter should be with user input received via the form. In an embodiment, the interpreter "SemanticURL" receives text corresponding to a semantic name of a website (e.g., Wolfram Research) and returns a particular uniform resource locator (URL) corresponding to the semantic name (e.g., http://www.wolfram.com).

The programming input 1900 also includes data 1916 indicating a second function to be applied to user input received via the form. In particular, the programming input 1900 specifies that the function "Composition[HTTPRedirect, First]" should be applied to the result of the first function 1912, i.e., SemanticURL. In an embodiment, the built-in function "HTTPRedirect" navigates to a web page at URL passed to the function. Thus, the programming input 1900 specifies that the built-in function SemanticURL should be applied to user input to generate a URL, and the built-in function HTTPRedirect should then be used to navigate to the URL.

In response to the programming input 1900, the forms generation module 750 generates an electronic form object configured to generate the form 1950 of FIG. 19B. The electronic form 1950 includes a GUI mechanism 1954 corresponding to the "Website" input of the programming input 1900. The GUI mechanism 1954 is a text box. In an embodiment, the forms generation module 750 generates the electronic form object such that the electronic form 1950 includes the text box in response to the specification data 1908. In particular, the forms generation module 750 assumes that the input will be text based on the first function 1912, which the forms generation module 750 knows receives input of type text, according to an embodiment. The electronic form 1950 includes a label 1958 for the text box 1954, and includes a second label 1066 for the second text box 1058.

The electronic form 1950 includes a submit button 1962. The forms generation module 750 generates the electronic form object such that the electronic form 1950 includes the submit button 1962 because utilizing a submit button is appropriate when utilizing text boxes, in an embodiment.

When the user enters a string in the text box 1954, and then selects the submit button 1962, the electronic form object is configured to apply the first function 1912 to the string in the text box 1954 to generate a URL. Additionally, the second function 1916 is applied to the generated URL causing the browser to refresh the web page.

Additionally, the specification data 1908 includes data 1920 relating to appearance of the electronic form to be generated. For example, the data 1920 indicates a "title" to be included in the form, a "description" to be included in the form, and a label to be used for the submit button 1962. Thus, the forms generation module 750 generates the electronic form object such that the electronic form 1950 includes a title 1966, a description 1970, and the submit button 1962 has the appropriate label.

In some embodiments, techniques and systems such as described above with respect to FIGS. 9-20C may be utilized with techniques and systems that facilitate efficient deployment of electronic forms to the Internet, an intranet, an extranet, etc. For example, techniques and systems such as described above may be utilized with cloud deployment techniques and systems described above with respect to FIGS. 1-8.

Referring again to FIG. 19A, the programming input 1900 may be evaluated completely (e.g., the function 1912 and the function 1916 may be evaluated at the same time as other parts of the programming input 1900) and based on the evaluation of the function 1912 and the function 1916, code is generated for the electronic form to cause the function 1912 and the function 1916 to be applied to input data when the electronic form 1950 is utilized by a user. In other embodiments, however, the function 1912 and/or the function 1916 may be evaluated at one or more subsequent times, such as upon or just before the function 1912 and/or the function 1916 are to be applied in response to user input (e.g., the function 1912 and/or the function 1916 may be evaluated in response to the user selecting the submit button 1962). Thus, in some embodiments, the generated code causes evaluation of the function to be completed at "runtime", e.g., after user input is received.

For example, in an embodiment, the server system 202 (FIG. 8) may evaluate the function 1912 and the function 1916 in response to the user selecting the submit button 1962. As another example, in an embodiment, a second server (not shown in FIG. 8) may evaluate the function 1912 and the function 1916 in response to the user selecting the submit button 1962. As yet another example, in an embodiment, the second server (not shown) may send the function 1912 and/or the function 1916 and user input received via the electronic form 1950 to the server system 202 (or a third server (not shown)), and the server system 202 (or the third server (not shown)) applies the function 1912 and the function 1916 to the user input. In this embodiment, the server system 202 (or the third server (not shown)) returns the result to the second server (not shown) for displaying in an output generated by the electronic form object. In some embodiments, the second server (and/or the third server) has a structure similar to the server system 202, e.g., with a processor, a memory, a NIC, etc.

FIG. 20A is an example of programming input 2000, and FIG. 20B is an illustration of an example graphical electronic form 2050 that may be rendered based on an electronic form object generated in response to the programming input 2000 of FIG. 19A, according to an embodiment.

The programming input 2000 includes a FormFunction 2004 within a CloudDeploy function 2008. As discussed above, the FormFunction 2004 causes the forms generation module 750 to generate an electronic form object, according to an embodiment. Additionally, the CloudDeploy function 2008 causes the cloud deployment module 2004 to deploy the electronic form object so that it is accessible via the Internet, for example.

The programming input 2000 includes specification data 2012 and a function 2016. The specification data 2012 indicates that user input (e.g., "from" and "to") should be interpreted as airports (e.g., ORD is interpreted as O'Hare International Airport, Chicago, Ill.; Boston is interpreted as Boston Logan International Airport, etc.).

The function 2016 comprises several built-in functions such as GeoGraphics, GeoPath, and GeoPosition. The function 2016 indicates that a graphic should be generated that shows, on a map, a path from the location "from" to the location "to".

Referring now to FIG. 20B, the form 2050 corresponds to a web page generated by the forms generation module 750 and deployed by the cloud deployment module 1404 in response to the programming input 2000. The web page 2050 includes text boxes 2054 and 2058 to receive the user input (e.g., "from" and "to"). The forms generation module 750 assumes that text boxes are appropriate because the specification data 2012 indicates that user input (e.g., "from" and "to") should be interpreted as airports. The web page 2050 also includes a submit button 2062.

The cloud deployment module 1404 caused the electronic form object to be deployed such that the electronic form object is accessible at a URL 2070.

FIG. 20C is an illustration of an example output 2075 generated by the electronic form object in response to a user entering "jfk" in the text box 2054, entering "cdg" in the text box 2058, and selecting the submit button 2062. In particular, the output 2075 is generated to include a graphic showing a map and showing a path from John F. Kennedy International Airport in New York, N.Y. to Charles de Gaulle Airport in Paris, France.

Referring again to FIG. 20A, the programming input 2000 may be evaluated completely (e.g., the function 2016 may be evaluated at the same time as other parts of the programming input 2000) and based on the evaluation of the function 2016, code is generated for the electronic form to cause the function 2016 to be applied to input data when the electronic form 2050 is utilized by a user. In other embodiments, however, the function 2016 may be evaluated at a later time, such as upon or just before cloud deployment of the electronic form object, or upon or just before the function 2016 is to be applied in response to user input (e.g., the function 2016 may be evaluated in response to the user selecting the submit button 2062). Thus, in some embodiments, the generated code causes evaluation of the function to be completed at "run-time", e.g., after user input is received.

For example, in an embodiment, the web server (not shown) may evaluate the function 2016 in response to the user selecting the submit button 2062. As another example, in an embodiment, the web server (not shown) may send the function 2016 and user input received via the electronic form 2050 to the server system 202 (or another server system (not shown)), and the server system 202 (or the other server system (not shown)) applies the function 2016 to the user input. In this embodiment, the server system 202 (or the other server system (not shown)) returns the result to the web server (not shown) for displaying in the output 2075 (FIG. 20C). In some embodiments, the web server (and/or the other sever) has a structure similar to the server system 202, e.g., with a processor, a memory, a NIC, etc.

In some embodiments, specification data in the programming input may specify that user input received via the electronic form is to be processed using natural language processing (NLP) techniques, and the function specified in the programming input is to be applied to a result of the NLP processing of the user input. In some embodiments, the programming input may also specify an entity type to which the user input is to correspond to assist with NLP processing. For example, in the example of FIGS. 15A-C, the programming input 2000 specifies that the user input corresponds to an entity type "Airport", thus NLP processing of the user input is focused on determining airport type entity corresponding to the user input. For example, a user may enter input in one of a variety of formats (e.g., a three-letter airport code (e.g., ORD), a city (e.g., Chicago), a city and state/province (e.g., Chicago, Ill.), a city and country (e.g., Chicago, USA), an airport name (e.g., O'Hare), etc.) and the NLP processing may process the input in an attempt to determine a corresponding entity. In some embodiments, the user input may be sent to a separate server system configured to perform NLP processing (e.g., using techniques such as described above), and the separate server system may return results of the NLP processing.

Instant API

Referring again to FIG. 1, the system 100 may facilitate efficient generation of application programming interfaces (APIs), and deployment of APIs to the web, according to some embodiments. For example, the cloud-based development system 188 and/or the cloud-based development front end 144 may include an API generation module that enables efficient and flexible generation of APIs. Embodiments of an API generation module and techniques for generating forms are discussed below. In some embodiments, such modules and techniques may be implemented by the system 100 of FIG. 1. In other embodiments, such modules and techniques may be implemented by systems different than the system of FIG. 1.

Figure 21:
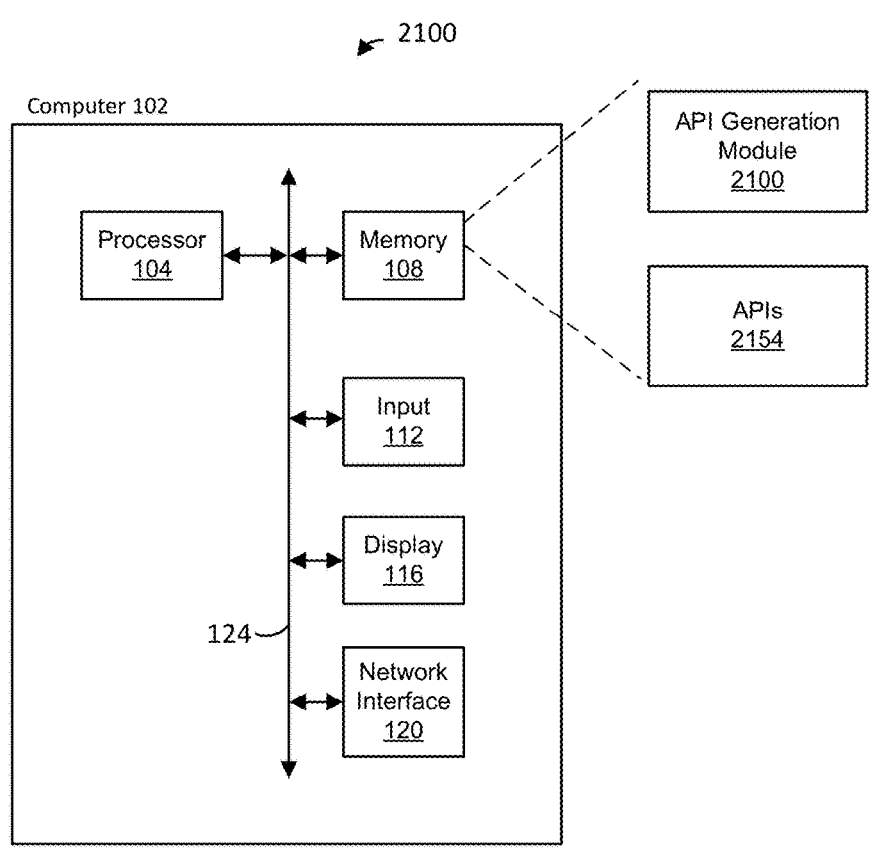
FIG. 21 is a diagram of an example system for generating application programming interfaces (APIs), according to an embodiment.

For example, FIG. 21 is a diagram of an example system 2100 for creating APIs, according to an embodiment. As described in more detail below, the system 2100 enables efficient and flexible generation of APIs, according to some embodiments.

In an embodiment, the system 2100 includes a computer similarly structured to the computer 102 of FIG. 1. For purposes of brevity, like-numbered components are not described in detail.

In an embodiment, the memory 108 may store an API generation module 2150 that facilitates generation of APIs, as will be described in more detail below. In an embodiment, the API generation module 2150 comprises software instructions that, when executed by the processor 104, causes the processor to evaluate programming input from a programmer to generate an API such that the API subsequently can be utilized to perform a processing action. For example, as will be described in more detail below, the generated API can be utilized by a software program running on the computer 102, the computational application 140 running on the computer 102 (not shown in FIG. 21), etc., according to various embodiments. As another example, as will be described in more detail below, the generated API can be deployed to cloud storage and made network accessible (e.g., using CloudDeploy or another suitable mechanism), and a software program running on the computer 102 or another suitable computer, the computational application 140 running on the computer 102 (not shown in FIG. 21) or another suitable computer, a cloud-based program running on one or more servers, etc., may utilize the API via a network, according to various embodiments.

In some embodiments, generated APIs 2154 are stored in the memory 108.

In some embodiments, the API generation module 2150 is a component of the cloud-based front end 144. In some embodiments, the API generation module 2150 is a component of a compiler, i.e., a computer program that transforms source code written in a programming language into another computer language, typically to create an executable program. In some embodiments, the API generation module 2150 is a component of an interpreter, i.e., a computer program that directly executes, i.e. performs, instructions written in a programming or scripting language (referred to herein for brevity as a "programming language"), without first compiling the instructions into a machine language program. Thus, in some embodiments, the programming input evaluated by the API generation module 2150 includes software instructions written in a programming language.

In some embodiments, the API generation module 2150 is a component of a software application such as a computational application 140 (FIG. 1). For example, the API generation module 2150 may be a component of the MATHEMATICA® computational software program developed by Wolfram Research, Inc., according to a specific embodiment.

Figure 22:
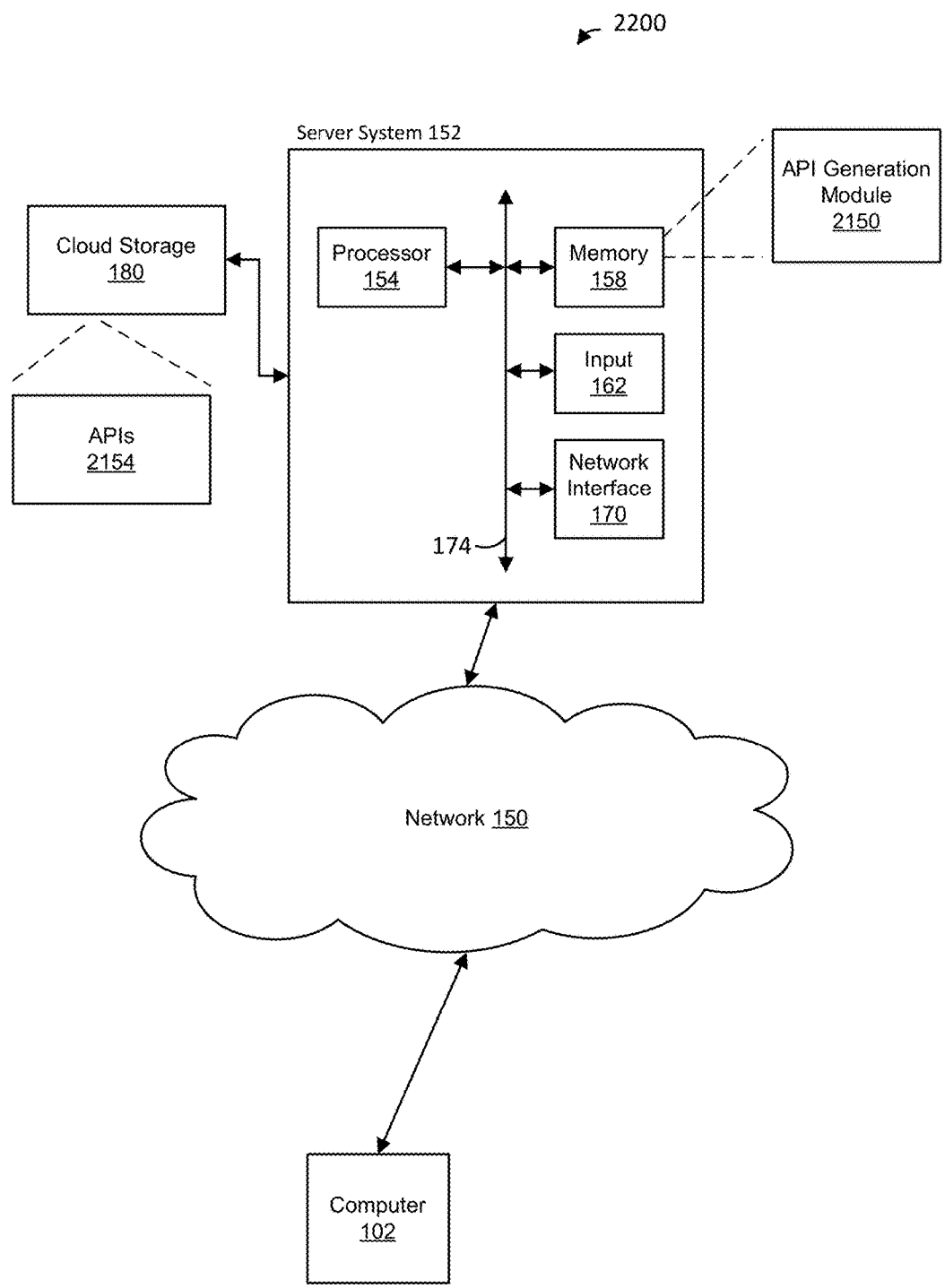
FIG. 22 is a diagram of another example system for generating APIs, according to another embodiment.

FIG. 22 is a diagram of another example system 2200 for generating APIs, according to another embodiment. As described in more detail below, the system 2200 enables efficient and flexible generation of APIs, according to some embodiments. In an embodiment, the system 2200 is similarly structured to the system 100 of FIG. 1. For purposes of brevity, like-numbered components are not described in detail.

In an embodiment, the memory 158 may store some of or the entire API generation module 2150 discussed above. For example, in an embodiment, the API generation module 2150 is implemented as a client-server system, and the memory 158 stores a server portion of the API generation module 2150, whereas the memory 108 of the computer 102 stores a client portion of the API generation module 2150. In an embodiment, a programmer uses the computer 102 to provide programming input to the server 152 via the network 150. The server 152 then generates an API, and the API is stored in a memory. For example, in an embodiment, the API is stored in the memory 158 and/or the cloud storage 180. In some embodiments, the cloud storage 180 is omitted. In another embodiment, the API is transmitted to the computer 102, via the network 150, and is stored in the memory 108. In another embodiment, the API is stored in a memory of another server system (e.g., a web server (not shown)) so that the API is accessible via the Internet, for example.

Figure 23:
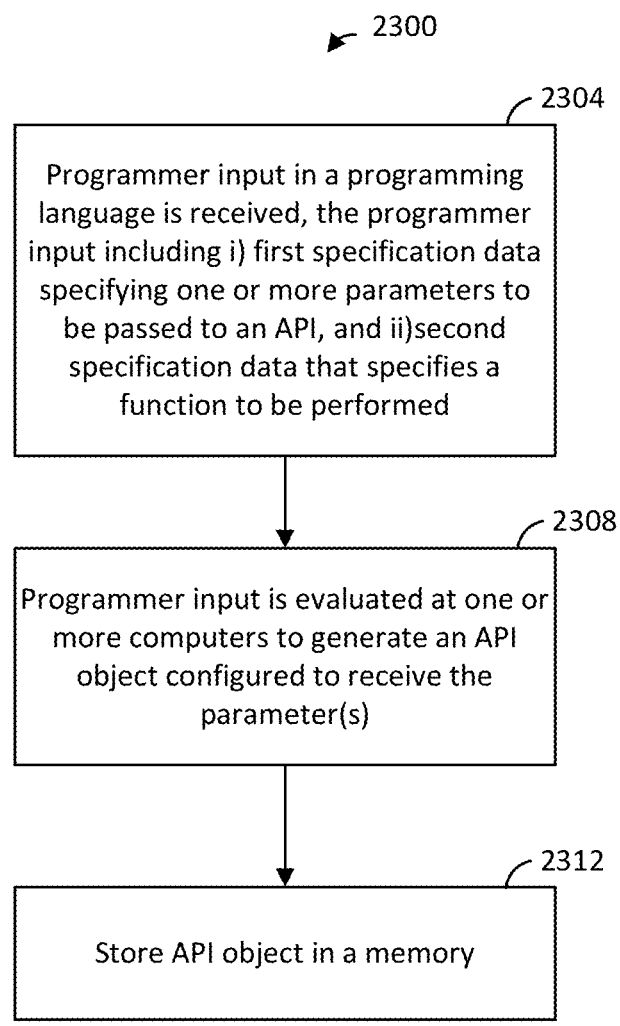
FIG. 23 is a flow diagram of an example method for generating APIs, according to another embodiment.

FIG. 23 is a flow diagram of an example method 2300 for generating an API, according to an embodiment. The method 2300 may be implemented by the computer 102 of FIG. 21 and/or the system 2200 of FIG. 22, in some embodiments, and the method 2300 is discussed with reference to FIGS. 21 and 22 for explanatory purposes. In other embodiments, however, the method 2300 is implemented by a suitable computer or a suitable system (e.g., multiple computers) other than the computer 102 and/or the system 2300 (e.g., by the system 100 of FIG. 1 or another suitable system).

At block 2304, programmer input in a programming language is received at one or more computers. For example, programmer input is received, via one or more input devices 112, at the computer 102. In some embodiments, the computer 102 transmits the programmer input to the server 152 via the network 150, and thus the programmer input is received at the server 152. The programmer input includes i) first specification data corresponding to input parameters for an API to be generated, and ii) second specification data that indicates a function to performed.

Figure 24A:
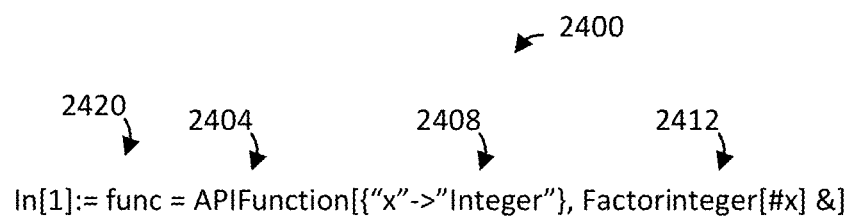
FIG. 24A is an illustration of a notebook including example programmer input for generating an API, according to an embodiment.

FIG. 24A illustrates an example of programmer input 2400 such as programmer input that can be received at block 2304, according to an illustrative embodiment. The programmer input 2400 includes built-in function 2404 of a programming language, i.e. APIFunction[ ], that a programmer may utilize to efficiently create an API. The built-in function 2404 includes two arguments: first specification data 2408 and second specification data 2412, where the first specification data 2408 specifies an input parameter to an API to be generated, and the second specification data that specifies a function to be applied to input parameter. In some embodiments, the first specification data also may specify, for each of at least some input parameters, a type of the parameter. For instance, in the example of FIG. 24A, the specification data 2408 specifies that the input parameter "x" is an "integer" type. In the illustrative embodiment of FIG. 24A, the programmer input 2400 may be entered into a file, a notebook, a web page, etc. In other embodiments other suitable programmer input is received in another suitable manner, such as via a spreadsheet, etc.

In the example of FIG. 24A, the second specification data 2412 specifies that a built-in function Factorinteger is to be applied on the input "x". The function Factorinteger is a built-in function, in an embodiment.

Referring again to FIG. 23, at block 2308, the programmer input is evaluated at one or more computers to generate an API that can be passed one or more parameters and that performs the specified function. For example, the API generation module 2150 may evaluate the programmer input, in an embodiment, to generate the API. In some embodiments, the programmer input is fully evaluated in response to receiving the programmer input. In other embodiments, the programmer is only partially evaluated. For example, in some embodiments, the second specification data 2412 may not be fully evaluated. For instance, if the specification data 2412 includes software code specifying a function to be performed, the software code may not be evaluated until the API is subsequently invoked or utilized, according to some embodiments. The API generation module 2150 may utilize the first specification data 2408 and the second specification data 2412 (and some or all (or none) of other arguments(s) and/or parameters, if provided in the programmer input) to generate the API. The API may include an electronic object having software instructions, where the electronic object is configured such that parameter(s) (specified by the first specification data) can be passed to the electronic object and the electronic object can be invoked to perform the specified function (specified by the second specification data) using the specified parameter(s), in some embodiments. In an embodiment, the API includes software instructions that can be executed by one or more computers to cause the one or more computers to perform the specified function using the specified parameter(s).

In some embodiments, the computer 102 implements block 2308. In some embodiments, the server 152 implements block 2308. In some embodiments, the computer 102 and the server system 202 together implement block 2308.

At block 2312, the API generated at block 2308 is stored in a memory. For example, in an embodiment, the API is stored in the memory 108. In another embodiment, the API is stored in the memory 158. In another embodiment, the API is stored in the cloud storage 180. In another embodiment, the electronic form object is stored in some other suitable memory such as a memory of a web server (not shown in FIGS. 21 and 22).

Figure 24B:
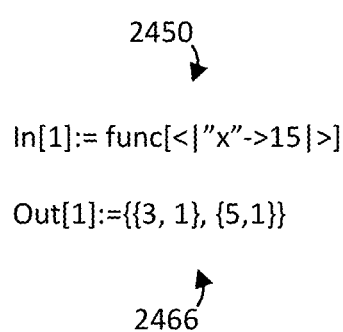
FIG. 24B is an illustration of a notebook including example programmer input for invoking an API, according to an embodiment.

Referring again to FIG. 24A, the programmer input 2400 includes a name 2420 for the API. The name 2420 ("func") can be utilized to access the API, in an embodiment. For example, FIG. 24B illustrates an example of programmer input 2450 that is used to access the API and provide a parameter to the API, according to an illustrative embodiment. The programmer input 2450 includes the name of the API ("func") and also data that indicates the parameter "x" is set to the integer fifteen. In response, the API is evaluated and returns a result 2466. In the illustrative embodiment of FIG. 24B, the programmer input 2450 may be entered into a file, a notebook, a web page, etc. In other embodiments other suitable programmer input is received in another suitable manner, such as via a spreadsheet, etc. In an embodiment, the result 2466 may be returned in the same file, notebook, spreadsheet, web page, etc., in which the programmer input 2450 was entered. In other embodiments, the result 2466 may be returned in a file, notebook, spreadsheet, web page, etc., separate from the file, notebook, spreadsheet, web page, etc., in which the programmer input 2450 was entered.

In some embodiments in which the API generation module 2100 is a component of a computational application such as the computational application 140, the API may be created by the computational application 140 and then used by the computational application 140. In some embodiments, the API may be created by the API generation module 2100 and/or the API generation module 2150 then made available for use by one or more of another application (e.g., different than the computational application 140), another program, and/or a different computer from the computer(s) on which the API was generated.

For example, in some embodiments, the generated API may be made accessible via network-accessible storage, such as the cloud storage 180. For example, the generated API may be made accessible via a URL, a URI, etc., or some other suitable mechanism. In some embodiments, the CloudDeploy function may be utilized to deploy an API to network-accessible storage such as the cloud storage 180.

Figures 25A, 25B:
FIG. 25A is an illustration of a notebook including example programmer input for generating an API and deploying the API to network-accessible storage, according to an embodiment.
FIG. 25B is an illustration of a web page generated by invoking an API, according to an embodiment.

FIG. 25A is an illustrative example in which a programmer utilizes the CloudDeploy function and the APIFunction to generate an API and deploy the generated API to network-accessible storage, such as the cloud storage 180. In the example of FIG. 25A, the API to be deployed utilizes a built-in function of MATHEMATICA®, GeoGraphics. The GeoGraphics function generates a 2-dimensional (2D) geographic image.

Programmer input 2500 includes the APIFunction 2504, first specification data 2508, and second specification data 2512, where the first specification data 2508 specifies an input parameter to an API to be generated and a type of the parameter, and the second specification data 2512 that specifies a function to be applied to input parameter. For instance, the specification data 2508 specifies an input parameter "name" of a type "Country", and the second specification data 2512 specifies that the GeoGraphics function is to be applied to the "country" input parameter to draw a polygon of the country indicated by the input parameter, and to generate a result in a Portable Network Graphics (PNG) format.

Additionally, the programmer input 2500 includes the CloudDeploy function 2540. Evaluation of the CloudDeploy function in FIG. 25A returns a handle corresponding to deployment of the expression. The handle includes a URL that enables access to the API. FIG. 25B illustrates a web page that a user sees when entering, in a web browser, a URL corresponding to the handle, and appending a parameter input to the URL (e.g., "?name=Italy"). In particular, the web page includes 2D geographic polygon drawing of Italy. In an embodiment, a server, such as the server 152, receives the URL with the appended parameter information from a requesting computer, uses the URL to locate the API in the cloud storage 180, evaluates the API using the appended parameter information to generate a result, and the returns to the requesting computer the result in a web page.

Thus, in various embodiments, the cloud-based development system 188 may be configured to perform one or more of, or various suitable combinations of two or more of: create an API, deploy the API, give and/or associate the API a name, associate the API with one or more methods, actions, and/or functions to be performed, and associate the API with one or more various parameters, store the API in the cloud storage 180, create a mapping paradigm to map portions of a URL or URI to the methods, actions, and/or functions and/or to the parameter(s) of the methods, actions, and/or functions, such that the methods, actions, and/or functions can be called from a browser, by a website, by a mobile application, by a form, etc., merely by sending a URL complying with the API. In embodiments, the cloud-based development system 188 may generate documentation for the API, describing the implementation of the API, the mapping of the methods, actions, and/or functions to the URL, the format of the data returned by the API, etc.

In some embodiments, the cloud-based development system 188 provides an option to allow a user to interact with the cloud-based development system 188 to edit or revise the mapping, the API name, and other aspects of the API creation. For example, in embodiments, the instant API module may suggest additional functions or methods to add to the API. The instant API module may also facilitate the use of data, variables, and/or parameters stored in the cloud (i.e., on the cloud servers), or data stored at a location specified by a URL. For example, the cloud-based development system 188 may provide various user interface mechanisms to permit a user to facilitate editing/revisions such as described above.

In some embodiments, the APIs can be configured to accept natural language (i.e., free-form) inputs. As an illustrative example, an API may be configured to accept a date input specified as "first Monday before Christmas." The API and/or the cloud-based development system 188 may include a module configured to convert such natural-language input to a canonical form.

In an embodiment, the programming language utilized by the computational application 140 (e.g., the Wolfram Language™ utilized by MATHEMATICA®) and associated with the cloud-based development system 188 permits representation of at least some objects (e.g., APIs) symbolically in the cloud.

In some embodiments, the computational application 140, the cloud-based front end 144, and/or the cloud-based development system 188 utilizes a computable document format (CDF) that allows exchange of components with interactive features between desktop and mobile platforms and the cloud-based development system 188 (for example). An author can generate a CDF document on desktop software (e.g., MATHEMATICA®), and deploy it to the cloud storage 180 using native function calls. From the cloud platform it can be served according to access control information to web visitors (e.g., publically, privately, or only to those who have a link to the document). The author can then access the deployed CDF (e.g., via the cloud-based development system 188) to make modifications. A revised version is then made available to all platforms automatically.

Connected Devices

Figure 26:
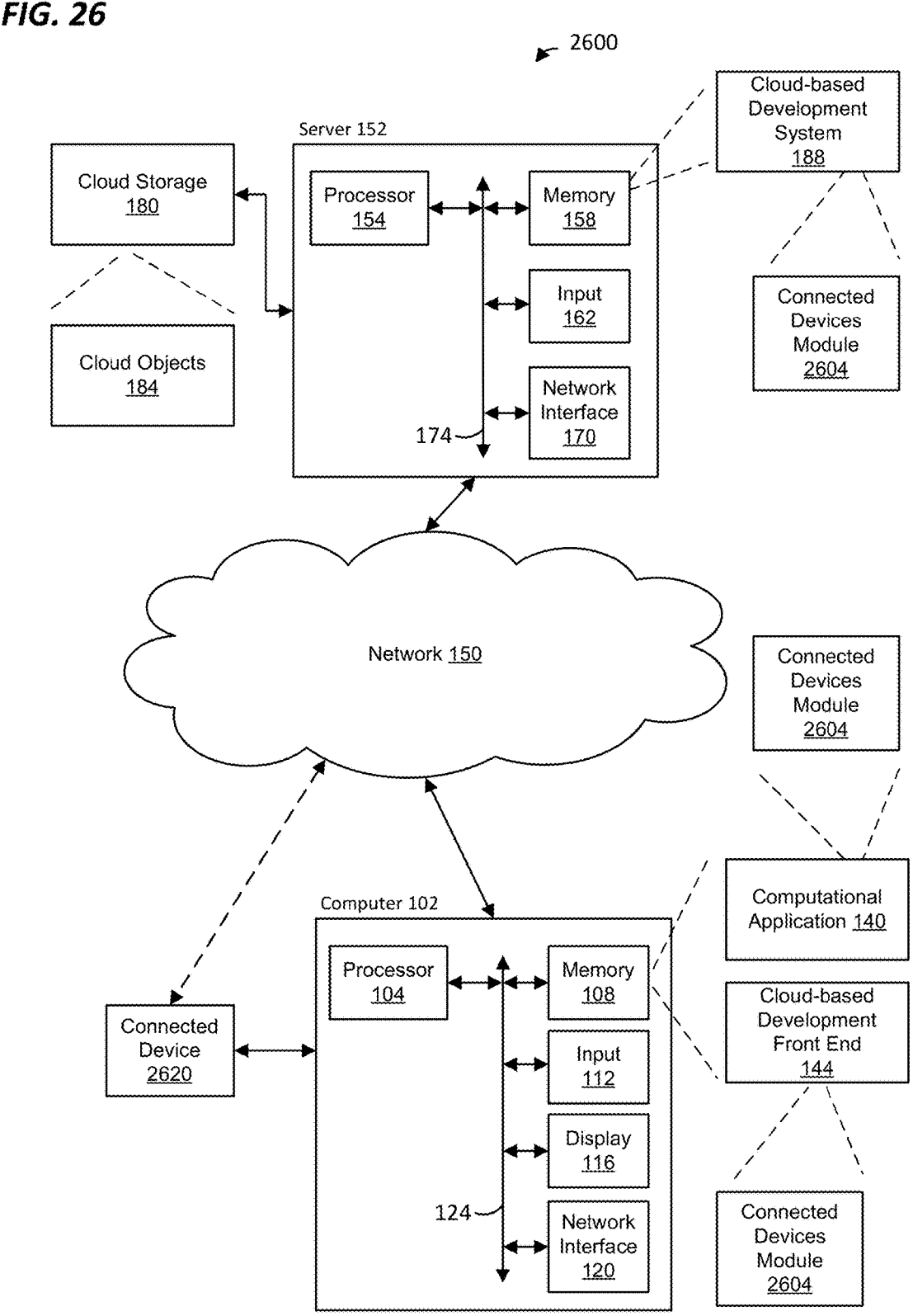
FIG. 26 is a diagram of an example system for interacting with a device that includes sensors and/or actuators for interacting with the real world, according to an embodiment.

Referring again to FIG. 1, the system 100 may facilitate efficient interaction with devices that have sensors and/or actuators to enable interaction with or sensing characteristics of the real world (referred to herein as "connected devices" for brevity), according to some embodiments. For example, the cloud-based development system 188, the cloud-based development front end 144, and/or the computational application 140 may include a connected devices module 2604 (or client/server, front end/back end, etc., portions thereof) that enables efficient and flexible interactions with connected devices. Embodiments of a connected devices module 2604 and techniques for interacting with connected devices are discussed below. In some embodiments, such modules and techniques may be implemented by the system 2600 of FIG. 26. In other embodiments, such modules and techniques may be implemented by suitable systems different than the system of FIG. 26. For example, in some embodiments, the server 152 may be omitted.

In an embodiment, the system 2600 is similarly structured to the system 100 of FIG. 1. For purposes of brevity, like-numbered components are not described in detail.

The system 2600 includes a connected device 2620, which may include, or be communicatively coupled to, one or more of i) one or more sensors, ii) one or more actuators, etc. For example, the computing device 504 may include a testing device, a sensor device, a device such as the Raspberry Pi device developed by the Raspberry Pi Foundation, a device such as the Arduino single board microcontroller device, a health monitoring device, a wearable fitness device, etc.

The connected device 2620 may include one or more processors (e.g., a microprocessor, a microcontroller, etc.) and one or more memory devices coupled to the one or more processors. Machine readable instructions may be stored in the one or more memory devices (hereinafter referred to as "the memory" for brevity), and when the one or more processors (hereinafter referred to as "the processor" for brevity) execute the machine readable instructions, the processor may perform various acts specified by the machine readable instructions.

The connected device 2620 may include one or more communication interfaces for communicating with one or more of the computer 102, the network 150, a sensor, an actuator, a hardware module, other hardware and/or programmable devices, etc. For example, the connected device 2620 may include one or more of a USB interface, a serial bus interface, a parallel bus interface, a port interface, a Bluetooth interface, a personal area network (PAN) interface, a FireWire interface, a PCI Express interface, an infrared interface, a fiber optic interface, a local area network (LAN) interface, a wireless local area network (WLAN) interface, a cellular communication network interface device, a wide area network (WAN) interface, etc.

In some embodiments, the connected device 2620 may be communicatively coupled to the computer 102.

In some embodiments, the connected device 2620 may be communicatively coupled to a server 102 via the computer 102 and the communication network 150. In some embodiments, the connected device 2620 may be communicatively coupled to the server 512 via the communication network 150 and not via the computer 102.

In some embodiments, the connected device 2620 may be configured to execute functional modules including one or more of i) an operating system; ii) a computational application kernel or engine (e.g., a MATHEMATICA® kernel or engine) for performing pre-defined functions and for executing computer-readable instructions based on an associated language (e.g., the Wolfram Language™); iii) a command line interface module for acting as a front end to the kernel/engine; iv) a notebook user interface front end to the kernel/engine; v) one or more data analysis engines configured to a) classify data in one or more data sets and/or to perform analysis, sometimes in cooperation with the computational kernel or other functional modules, of data in one or more data sets; b) generate and/or implement APIs; c) interpret free-form data and/or convert the free-form data into structured data; d) classify data sets; e) facilitate cloud execution of various computational functions requested from external devices (e.g., other computers, servers, and/or embedded devices) by, for example, receiving and answering function calls originating in software executing on those external devices; f) generate and/or update reports based on various datasets stored in the cloud or passed to the functional module from an external device; etc.

In some embodiments, modules executed on the connected device 2620 permit using a high-level programming language to quickly and easily cause the connected device 2620 to interact with the real world (e.g., gather data from sensors, control an actuator, move a robot arm, etc.) without a user needing to have in-depth knowledge and understanding of the underlying hardware.

In some embodiments, a user may interact with (e.g., configure, program, get sensor data from, control an actuator, etc.) the connected device 2620 via a user interface module executed by the connected device 2620. In some embodiments, the connected device 2620 may include, or be coupled to, user interface devices such as a keyboard, a keypad, a touch screen, a button, a mouse, a display device, etc., and the user may interact with the connected device 2620 via such user interface devices. In some embodiments, the user may interact with the connected device 2620 via user interface devices of or coupled to the computer 102, where data is exchanged between such user interface devices and the connected device 2620 via a communication link between the connected device 2620 and the computer 102.

In other embodiments, the connected device 2620 may act more as a "dumb" terminal, where user interface functions are executed on another device such as the computer 102. Additionally, in some embodiments, the connected device 2620 may omit a man-machine interface.

For example, in some embodiments, the computer 102 may be configured to execute functional modules including one or more of i) an operating system; ii) a computational kernel or engine (e.g., a MATHEMATICA® kernel or engine) for performing pre-defined functions and for executing computer-readable instructions based on an associated language (e.g., the Wolfram Language™); iii) a command line interface module for acting as a front end to the kernel/engine; iv) a notebook user interface front end to the kernel/engine; v) one or more data analysis engines configured to a) classify data in one or more data sets and/or to perform analysis, sometimes in cooperation with the computational kernel or other functional modules, of data in one or more data sets; b) generate and/or implement APIs; c) interpret free-form data and/or convert the free-form data into structured data; d) classify data sets; e) facilitate cloud execution of various computational functions requested from external devices (e.g., other computers, servers, and/or embedded devices) by, for example, receiving and answering function calls originating in software executing on those external devices; f) generate and/or update reports based on various datasets stored in the cloud or passed to the functional module from an external device; g) convert software code between different programming languages (e.g., between C++ and the Wolfram Language™, between JAVA and the Wolfram Language™, between C++ and JAVA, etc.); etc.

In some embodiments, the connected devices module 2604 executing on the computer 102 permits using a high-level programming language to quickly and easily interact with the connected device 2620 without a user needing to have in-depth knowledge and understanding of the underlying hardware of the connected device 2620.

In some embodiments, a user may interact with (e.g., configure, program, get sensor data from, etc.) the connected device 2620 via a user interface module executed by the computer 102 (e.g., a component of the connected devices module 2504). In some embodiments, the computer 102 may include, or be coupled to, user interface devices such as a keyboard, a keypad, a touch screen, a button, a mouse, a display device, etc., and the user may interact with the connected device 2620 via such user interface devices. For example, a user may develop code, using the computer 102, for interacting with the connected device 2620, and then cause the code to be deployed to the connected device 2620 via a communication link (e.g., USB, Bluetooth, WLAN, etc.) between the computer 102 and the connected device 2620. As another example, a user may develop code, using the computer 102, for interacting with the connected device 2620, and then cause the code to be deployed to the connected device 2620 via the server 152. Such deployed code may then be executed by the connected device 2620.

In other embodiments, a user may develop code, using the computer 102, for interacting with the connected device 2620, and then cause the code to be deployed to the cloud storage 180. The deployed code may then be executed by the server 152, causing the server 152 to interact with the connected device 2620 (e.g., extract data from the connected device 2620, configure/program the connected device 2620 to perform a particular task, etc.). The server 102 may communicate with the connected device 2620 via the network 150, in some embodiments. In some embodiments, the computer 102 may act as a conduit for communications between the server 152 and the connected device 2620. In other embodiments, the server 152 and the connected device 2620 may communicate without going through the computer 102 (e.g., if the connected device 2620 is capable of establishing a communication link with another device such as a router, an access point, another computer, etc.).

In some embodiments, a module executed by the connected device 2620 may cause the connected device 2620, when the connected device 2620 is communicatively connected to the network 150 (e.g., directly or via one or more other devices such as a gateway device, a router, a switch, an access point, the computer 102, etc.), to inform the server 152 of its presence. This may facilitate one or more other computers (e.g., the computer 102 or another computer) that are communicatively connected to the server 152 discovering the presence of the connected device 2620, and then interacting with the connected device 2620 (e.g., via the server 152 or without the sever 152 acting as an intermediary). Additionally or alternatively, in some embodiments, a module executed by the connected device 2620 may cause the connected device 2620, when the connected device 2620 is communicatively connected to the computer 102 (e.g., directly (e.g., via USB, Bluetooth, peer-to-peer connection, etc.) or via one or more other devices such as a gateway device, a router, a switch, an access point, etc.), to inform the computer 102 of its presence. This may facilitate the computer 102 discovering the presence of the connected device 2620, and then interacting with the connected device 2620 (e.g., via the server 152 or without the server 152 acting as an intermediary). In some embodiments, the user computer 102 may report the presence of the connected device 2620 to the server 152.

As an illustrative example, when a new Raspberry Pi device (or other suitable connected device 2620) is connected to a USB port of the computer 102, which is connected to the server 152 via browser session, for example, the server 152 may detect the presence of the Raspberry Pi device and generate a dialog window in the browser window such as: "you just connected a new Raspberry Pi device to xyxy.ngb.chic.1.2.3.4-JohnSmith-Desktop—link to your Cloud Platform account?<OK/CANCEL>". If "OK" is selected, the cloud server system 512 may prompt to name the device, e.g.,: "What would you like to name your new device?" A suitable name such as RasPi1 may be selected by the user.

Devices connected to the computer 102, and sensors connected to those devices, may be represented in a window using a tree data structure, for example, which is updated in real-time as devices are hot-plugged/unplugged, and device sensors go into different states. A similar tree data structure may also be made available via the server 152, in some embodiments.

Your Devices
= = = = = = = = = = = =
- RasPi1+[shutdown/reboot/ping/ . . . ]
- - - - USB
- - - - GPIO [- - - - - ]
- - - - Ethernet [ip=1.2.3.4/255]
- !RasPi2 [disconnected]
- WeatherStation
- - - - USB1
- - - - USB2
- - - - Temperature [25 celsius]
- - - - Humidity [43%]

Figures 27, 28:
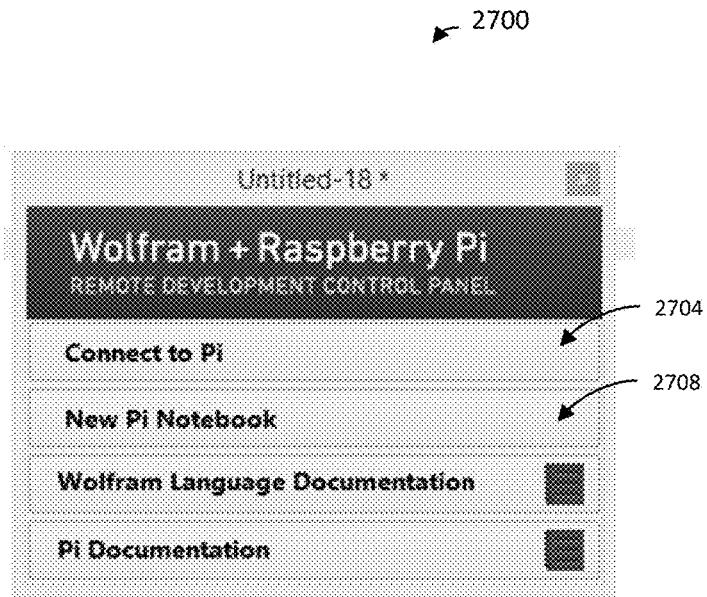
FIG. 27 is an illustration of an example graphical user interface for interacting with a device, according to an embodiment.
FIG. 28 is an illustration of a notebook of a computational application including example programmer input for interacting with a remote device, according to an embodiment.

FIG. 27 is an illustration of an example GUI 2700 implemented on the computer 102 or some other suitable computer, according to an embodiment. The GUI 2700 may facilitate interaction with the connected device 2620. The GUI 2700 may be implemented by the connected devices module 2604, according to an embodiment. For instance, in an embodiment, connected devices module 2604 may permit a user to interact with the connected device 2620 using a notebook of the communication application 140. In some embodiments, the connected devices module 2604 provides a front end for a computational application kernel running on the connected device 2620. In such embodiments, a user can utilize a high level programming language to control and/or retrieve data from the connected device 2620 without needing knowledge of low-level and/or hardware level details regarding the connected device 2620.

Similarly, in some embodiments, the connected devices module 2604 acts as an intermediary between i) the computational application 140 running on the computer 102 or a computational application kernel running on the server 152, and ii) the connected device 2620. In such embodiments, a user can utilize a high level programming language to control and/or retrieve data from the connected device 2620 without needing knowledge of low-level and/or hardware level details regarding the connected device 2620.

In an embodiment, the connected devices module 2604 maintains association data regarding connected devices (e.g., the connected device 2620) associated with the computer 102 and/or a user. The connected devices module 2604 may utilize the association data to identify connected devices (e.g., the connected device 2620) associated with the computer 102 and/or the user, such that when the user is using the computer 102 or another computer (e.g., using the computational application 140 on the computer 102 and/or the server 152), the user can be provided with options for establishing connections with one or more connected devices (e.g., the connected device 2620) and/or interacting with the one or more connected devices. In an embodiment, the association data may comprise globally unique identifiers (e.g., UIDs, media access control (MAC) addresses, etc.) of connected devices, computers, etc., and/or user identifiers (IDs).

In some embodiments, a module executed on the connected device 2620 may map i) programmer input in a high level language (e.g., the Wolfram Language™), computational application built-in functions, etc., and/or corresponding message data to ii) low-level and/or machine level instructions and/or configuration information. In some embodiments, the computer 102 and/or the server 152 includes a driver module configured to facilitate communications between i) the computer 102 and/or the server 152 and ii) the connected device 2620. In some embodiments, the driver module may permit transfer of high level language instructions/functions, (e.g., the Wolfram Language™), computational application built-in functions, etc., to the connected device 2620. In some embodiments, the driver module may permit transfer of data, objects, messages, etc., formatted i) according to a high level language (e.g., the Wolfram Language™) and/or ii) for processing by the computational application 140, etc., from the connected device 2620.

In some embodiments, a module executed on the computer 102 and/or the server 152 may map i) programmer input in a high level language (e.g., the Wolfram Language™) computational application built-in functions, etc., and/or corresponding message data to ii) low-level and/or machine level instructions and/or configuration information to permit interaction with the connected device 2620 via the driver module, for example.

In some embodiments, the connected devices module 2604 is configured to interface with a plurality of types of connected devices 2620. In some embodiments, the connected devices module 2604 includes data for performing mappings between high level programmer/user input and low-level/machine level instructions/configuration information for the plurality of different types of connected devices 2620. For example, in some embodiments, the connected devices module 2604 may include or have access to mapping information to enable mapping between high level programmer/user input and low-level/machine level instructions/configuration information for the plurality of different types of connected devices 2620.

In some embodiments, the connected devices module 2604 is configured to perform initial communications with a connected device 2620 to determine the type of the connected device 2620. Based on the determined type of the connected device 2620, the connected devices module 2604 may be configured to determine a particular mapping appropriate for the connected device 2620, the mapping to be used for converting high level programmer/user input to low-level/machine level instructions/configuration information appropriate for the particular connected device 2620.

Referring again to FIG. 27, a button 2704, when activated, may cause the computer 102 (or the server 152, in an embodiment) to establish a connection with the connected device 2620 (e.g., a Raspberry Pi device), according to an embodiment. In various embodiments, establishing a connection may include utilizing a device driver determined to be appropriate for the connected device 2620, and/or utilizing appropriate mapping information to convert high level programmer/user input to low-level/machine level instructions/configuration information appropriate for the particular connected device 2620.

A button 2708, when activated, may open a new notebook associated with the connected device 2620, according to an embodiment. For example, in some embodiments, a user can interact with the connected device 2620 using a high-level software language such as the Wolfram Language™ and a notebook of a computational application such as MATHEMATICA®. As an illustrative embodiment, a user can send configuration data and/or control data to the connected device 2620 with programming input (in a high-level software language such as the Wolfram Language™) entered into the notebook. As another illustrative embodiment, a user can retrieve data (such as one or more of sensor data, operational data, configuration data, etc.) from the connected device 2620 with programming input (in a high-level software language such as the Wolfram Language™) entered into the notebook. In other embodiments, a user can interact with the connected device 2620 using a high-level software language and/or functions provided by other types of computational applications such as a spreadsheet application and a notebook, workspace, spreadsheet of the computational application (e.g., a spreadsheet document of the spreadsheet application). In some embodiments, appropriate mapping information is utilized to convert high level programmer/user input to low-level/machine level instructions/configuration information appropriate for the connected device 2620.

Data from the connected device 2620 can be made network accessible using techniques such as described above. For example, a programmer can utilize high-level programmer input, functions, instructions, etc., such as CloudDeploy, CloudPut, etc. and/or other suitable programmer input, functions, instructions, etc., in various embodiments.

The connected devices module 2604 executing on one or more of the connected device 2620, the computer 102, another computer, the server 152, etc., may provide a set of device interaction functions, instructions, etc., for interacting with the connected device 2620. In some embodiments, the set of device interaction functions, instructions, etc., may permit configuring and/or interacting with connected devices 2620 using a high-level programming language, high-level commands, functions, etc., without a user needing to have in-depth knowledge and understanding of the underlying hardware.

An example set of device interaction functions is provided below. The example set of device interaction functions is merely one example, according to an embodiment, and other suitable sets of functions may be utilized. For example, other suitable set of device interaction functions may include additional functions, may omit one or more of the following functions, may include modified versions of one or more functions, may combine two or more of the following functions into a single function, may implement one of the following functions as multiple separate functions, may use different function names, may have fewer, more, and/or different parameters, etc.

Some functions may be useful for setting up and/or configuring hardware devices included in or communicatively connected to the connected device 2620, establishing connections with hardware devices included in or communicatively connected to the connected device 2620, etc.

A DeviceOpen function may be utilized to open a connection to the connected device 2620. The DeviceOpen function returns a DeviceObject expression and/or object that represents the connected device 2620, e.g., a handle to the connected device 2620. The DeviceObject may be utilized to refer to the connected device 2620 using the high-level language, functions, instructions, etc., of the computational application 140. The DeviceOpen function may take one or more arguments, in various embodiments. For example, in an embodiment, a "devclass" argument may be utilized to specify a class of devices. In an embodiment, DeviceOpen["devclass"] may open a connection to a first available connected device of the specified class. As another example, in an embodiment, a "spec" argument may be utilized to specify a particular device within a specified class. In an embodiment, DeviceOpen["devclass", spec] may open a connection to a connected device defined by spec. As another example, in an embodiment, a "device" argument may be utilized to specify a device corresponding to a DeviceObject expression/object.

Some example usages of DeviceOpen are provided below:
DeviceOpen["GPIO"]\[LongRightArrow]DeviceObject [{"deviceclass", "deviceid" }]
DeviceOpen["Arduino", "/dev/tty5"]
DeviceOpen["Arduino", XXXX]
DeviceOpen["Serial", {XXXXX, BitRate->XXXX} ]
DeviceOpen["Camera", {RasterSize->XXXX}, XXXXX]

A DeviceConfigure function may be utilized to configure a connected device. For example, in an embodiment, DeviceConfigure may include two arguments: e.g., DeviceConfigure[device, config], which causes configuration of the specified device (e.g., "device" argument may correspond to a DeviceObject expression/object) according to configuration information specified by the config parameter.

A DeviceClose function may be utilized to close a connection to a connected device and release resources associated with the connected device. In an embodiment, the DeviceClose function may include an argument that indicates the connected device: e.g., DeviceClose[device].

A FindDevices function may be utilized to find available connected devices. For example, in an embodiment, the FindDevices function may return a DeviceObject expression for each discovered device.

A DeviceInformation function may be utilized to retrieve information about a connected device. In an embodiment, the DeviceInformation function may include an argument that indicates the connected device: e.g., DeviceInformation [device].

A CameraOpen function may be utilized to open a connection to a camera device.

A DeviceRead function may be utilized to read data from the connected device 2620. The DeviceRead function returns an object corresponding to data read from the connected device 2620. The returned object may be in a format that is computable by, and can be processed by, the high-level language, functions, instructions, etc., of the computational application 140. The DeviceRead function may take one or more arguments, in various embodiments. For example, in an embodiment, a "device" argument may be utilized to specify a device corresponding to a DeviceObject expression/object. As another example, a "devclass" argument may be utilized to specify a class of devices, and data may be read from a default device in the specified class. In an embodiment, one or more device parameters to be read from the device may be specified.

FIG. 28 is an illustration of an example notebook 2800. In the example of FIG. 28, a parameter "Humidity" is read from a weather station device. An object ("21.4%") is returned. In an embodiment, the returned object may be in a format that is computable by, and can be processed by, the high-level language, functions, instructions, etc., of the computational application 140. In an embodiment, the returned object may be processed by the computational application 140 within the notebook 2800. For example, in an embodiment, a subsequent function entered by a user in the notebook 2800 can utilize the returned object may be processed by the computational application 140 within the notebook 2800. As another example, in an embodiment, an expression such as x=DeviceRead[dev, "Humidity"] could be entered in the notebook 2800, and after evaluation by the computational application 140, the object x would be equal to "21.4%". Then, the object x could be utilized as a parameter, input, etc., of a subsequent function, expression, etc., and the subsequent function/expression could be evaluated by the computational application 140.

A DeviceReadList function may be utilized to repeatedly read items of data from a connected device a specified number of times. The DeviceReadList function returns an object corresponding to data read from the connected device 2620. The returned object may be in a format that is computable by, and can be processed by, the high-level language, functions, instructions, etc., of the computational application 140. The DeviceReadList function may take one or more arguments, in various embodiments. For example, in an embodiment, a "device" argument may be utilized to specify a device corresponding to a DeviceObject expression/object. As another example, a "devclass" argument may be utilized to specify a class of devices, and data may be read from a default device in the specified class. In an embodiment, one or more device parameters to be read from the device may be specified.

A DeviceReadTimeSeries function may be utilized to read items of data from a connected device at specified times or intervals and conduct time series object, e.g., an object including time-value pairs. The DeviceReadTimeSeries function returns an object corresponding to data read from the connected device 2620. The returned object may be in a format that is computable by, and can be processed by, the high-level language, functions, instructions, etc., of the computational application 140. The DeviceReadTimeSeries function may take one or more arguments, in various embodiments. For example, in an embodiment, a "device" argument may be utilized to specify a device corresponding to a DeviceObject expression/object. As another example, a "devclass" argument may be utilized to specify a class of devices, and data may be read from a default device in the specified class. In an embodiment, one or more device parameters to be read from the device may be specified.

A DeviceReadLatest function may be utilized to read a most recently collected item from a connected device. The DeviceReadLatest function may take one or more arguments, in various embodiments. For example, in an embodiment, a "device" argument may be utilized to specify a device corresponding to a DeviceObject expression/object. As another example, a number of most recently collected items to be read from the device may be specified. In an embodiment, one or more device parameters to be read from the device may be specified.

A DeviceReadBuffer function may be utilized to read the entire contents of a buffer on the device. The DeviceReadBuffer function may take one or more arguments, in various embodiments. For example, in an embodiment, a "device" argument may be utilized to specify a device corresponding to a DeviceObject expression/object. As another example, a number of items to be read from the buffer may be specified. In an embodiment, one or more device parameters to be read from the device may be specified. In an embodiment, a criterion parameter to indicate that data is to be read from the buffer until the criterion is met.

A DeviceWrite function may be utilized to write a value or a list of values to a device. The DeviceWrite function may take one or more arguments, in various embodiments. For example, in an embodiment, a "device" argument may be utilized to specify a device corresponding to a DeviceObject expression/object. As another example, one or more device parameters to which one or more values are to be written may be specified.

A DeviceExecute function can be utilized to cause the connected device 2620 to execute a specified command. The DeviceExecute function may take one or more arguments, in various embodiments. For example, in an embodiment, a "device" argument may be utilized to specify a device corresponding to a DeviceObject expression/object. As another example, a "command" that is to be executed may be specified, in an embodiment. As another example, one or more parameters for the command may be specified, in an embodiment.

FIG. 29 is an illustration of an example notebook 2900, according to an embodiment. In the example of FIG. 29, the DeviceExecute function is utilized to cause a weather station device to execute a "ClearLCDDisplay" command to cause the device to clear an LCD screen on the device. FIG. 30 is an illustration of an example notebook 3000, according to an embodiment. In the example of FIG. 30, the DeviceExecute function is utilized to cause check if a response on the device is available and to flush buffered data on the device.

A DeviceExecuteAsynchronous function may be utilized to initiate asynchronous execution of a specified command on the device. In an embodiment, the DeviceExecuteAsynchronous includes one or more of the following parameters: "device", "command", and "fun", where "device" argument may be utilized to specify a device corresponding to a DeviceObject expression/object, "command" indicates the command that is to be executed, and "fun" indicates a handler function fun to be called when an event occurs. FIG. 31 is an illustration of an example notebook 3100, according to an embodiment. In the example of FIG. 31, the DeviceExecuteAsynchronous function is utilized to read from a demonstration device that retrieves cookies from a specified URL, calling a MATHEMATICA function URLFetchAsynchronous in the background.

A DeviceStream function returns a stream or list of streams associated with a device.

An IMAQ'StartCamera function may start an NI-IMAQ camera device taking pictures.

In one illustrative example, the connected device 2620 includes or is communicatively coupled to a weather-related hardware device (e.g., a Raspberry Pi Weather Module) that includes a temperature sensor, a humidity sensor, and a pressure sensor. A user may retrieve data from the hardware device such as using the following sequence of high-level programming inputs:

In[1]:=obj=DeviceOpen["RaspberryPiWeatherStation"]
Out[1]=DeviceObject[{RaspberryPiWeatherStation, 1} ]
In[2]:=DeviceRead[obj, "Temperature"]
Out[2]=25 degrees Celsius
In[3]:=DeviceRead[obj, "Humidity"]
Out[3]=30 percent
In[4]:=DeviceRead[obj, "Pressure"]
Out[4]=993 hectopascals where In[ ]:=is a prompt after which follows a user input, and Out[ ]=indicates a returned output responsive to the corresponding input.

In another illustrative example, the connected device 2620 includes or is communicatively coupled to a positioning system device (e.g., a GPS Module). A user may retrieve data from the positioning system device such as using the following sequence of high-level programming inputs:

serial=DeviceOpen["Serial", {"/dev/ttyusb0", "BaudRate"->9600}]

This returns a DeviceObject from which positioning data (e.g., GPS data) can be read. For example, DeviceReadBuffer can be used to read all data that has been buffered thus far.

data=DeviceReadBuffer[serial, "String"]

In one embodiment, the data may be returned in a comma separated format called GPS NMEA sentences. This data can be imported using ImportString.

csv=ImportString[data, "CSV"]

The NMEA sentences that contain GPS coordinates start with the string "$GPRMC", so the returned data can be filtered:

gps=Cases[csv, {"$GPRMC", _}]

In NMEA sentences, the coordinates (latitude and longitude) are in the 4th and 6th position of each list,:

Part[gps, 1, {4,6}]/100 which may return, in an example, a set of coordinates such as:

{40.0583, 88.1474}.

As discussed above, the user computer 102 can interact with the connected device 2620 via a direct connection, and/or the user computer 102 or another computer can interact with the connected device 2620 via the server 152, in various embodiments. In some embodiments, a function such as the CloudAttach function can be utilized to interact with the computing device 504.

In some embodiments, the cloud-based development system 188 executed on the server 152 and i) the connected devices module 2604 executed on the computer 102 and/or ii) a module executed on the connected device 2620 may assist making data collected from and/or generated by the connected device 2620 available via the cloud storage 180. Additionally, a wizard module executed on the server 152 and/or the computer 102 may assist the user in making data available via the cloud storage 180. For example, the user may be prompted to identify a source of the data (e.g., a file, a sensor connection, an external source, etc.). The user may specify how raw data is to be processed (e.g., unit conversion, statistical analysis, etc.). A template may be generated that indicates how a report is to be generated using the raw data (e.g., how the raw data is to be processed, formatting of the report, etc.) In some embodiments, the template may include high-level software that specifies how raw data is to be processed, for example, and such software is evaluated when an instance of a report is generated. In some embodiments, the template or another intermediary document may be organized in sections or cells, and a user can specify whether to exclude certain cells from a report, whether to included certain cells in the report, etc. Similarly, in some embodiments, a user may be able to suppress certain cells that generate certain messages, and/or suppress a report altogether based on cell content (e.g., invalid data). A user may be permitted to select an output format for a report: e.g., HTML, XML, CDF, downloadable, PDF, etc. A user may be able to configure notifications regarding reports, such as a list of recipients to be notified when reports are generated, whether a generated report passes or fails, etc.

Additionally, scheduling of report instance generation may be specified. For example, a report instance may be generated periodically, at specified times, in response to events, etc. For example, a report instance may be generated upon a user request via the server 152, a report instance may be generated periodically, a report instance may be generated when new raw data is available, etc. Then, the reports and/or report instances may be deployed to the cloud storage 180 and thus made available via a URL, for example.

A user can utilize a function such as CloudPut[ReportGenerate[ ]]. A user can send report instances as an email attachment or can send a link to a report instance or report.

Code Generation/Conversion

In various embodiments, systems such as described above also include functionality that allows for the generation of programming instructions in languages other than a native language ("external languages"). For example, the cloud platform may operate according to a primary language (e.g., Wolfram Language), but may be capable of generating programming instructions for other, external languages (e.g., HTML, Javascript, Python, C++, Xcode, etc.).

A Function Call Interface creates a bi-directional mapping of types between the primary language and the external language. First a mapping is created between the primary language types and the types of the external language. Second, a parser is implemented to serialize the external language types into the primary language.

The interface between the primary language and the external language facilitates the use of the cloud platform from within other programming languages. Specifically, the interface facilitates the automatic generation of code in an external language, which code can access the cloud platform via an API (e.g., via an API generated by the CloudDeploy[ ] function or the Instant API module).

An ExternalFunction[ ] function may operate to take an input and perform some action or computation in a specified external programming language. For example, "ExternalFunction["Python", {x}, x!] [10]" may cause the computation of 10 factorial (10!) using a Python function.

An EmbedCode[ ] function may generate code in a specified external programming language. For example, "EmbedCode[obj, "Python"]" may cause an output of code that can be used in a Python script to execute the function or object stored as "obj". The output may be in the form of a file, in the form of text for cutting and pasting into the external-language code, or both. In embodiments, the function or object called in the external language is set up as an API accessing functionality of the cloud platform.

obj=CloudDeploy[ExternalFunction["Python", {x}, x!],
    Permissions □ "Public"]
    EmbedCode[obj, "Python"]

The example code above may define an object "obj" as the output of the CloudDeploy function. The output of the CloudDeploy function would be a URL (e.g., "https://www.cloudplatform.com/objects/abcde12345") that, when accessed, executed the external Python function factorial x. The EmbedCode function would output code that could be included in a Python script, which code would access the URL and execute (in the cloud) the external Python function factorial x. That is, the Python script would be using computing power of the cloud platform to perform the script. The generated code, in this case, might look like:

import name
    defendant f(x):
    return
    name.call("https://www.cloudplatform.com/objects/abcde12345", x=x)

The utility of this construct is more readily apparent if we change the example slightly. Consider the following:

obj=CloudDeploy[ExternalFunction["Python", {x}, x!],
    Permissions □ "Public"]
    EmbedCode[obj, "ObjectiveC"]

In this example, the object is defined the same way, but the EmbedCode function generates Objective C code for calling accessing the URL to execute (in the cloud) the external Python function factorial x. Simply put, we have just allowed an Objective C program to perform a function that is implemented in Python, effectively performing a conversion between the two languages.

Still further, the process described above need not include two external languages. The object (obj) could be defined in the primary language (instead of using the ExternalFunction expression), implemented as an API (e.g., using Instant API or CloudDeploy[ ]), and called from an external language program (e.g., Objective C or Python) by generating code in the external language using the EmbedCode[ ] function.

The ability to embed functionality of one language (either the primary language or an external language) in code of an (different) external language is advantageous in a number of different circumstances. For instance, an algorithm that cannot be run on a particular processor or on hardware that is lacking in some way, can be implemented on the cloud platform, deployed as an API, and accessed by software running on the particular processor hardware.

Similarly, functional limitations of a language can be overcome. Objective C is viewed by some as lacking sufficient visualization functionality. Using the system described herein, the visualizations can be handled by the cloud platform by, for example, creating a function to perform the visualization processing on the cloud platform, implementing an API to allow the function to be called, generating code in Objective C to use the API to call the function on the cloud platform (including, possibly, passing data—e.g., by way of the API—from the Objective C program to the function executing on the cloud platform), performing the visualization processing on the cloud platform, and returning the visualized results to the Objective C program.

In various embodiments, one or more of the following syntaxes are utilized:

EmbedCode[obj]

In this example, code for embedding the object obj on a web page is generated.

EmbedCode[obj. "dest"]

In this example, code for an external environment or language of type "dest" is generated.

In EmbedCode[obj], the object obj can be a CloudObject, according to an embodiment.

EmbedCode[obj] returns a string that can be inserted into the HTML of a web page to embed obj on the page, according to an embodiment.

In EmbedCode[obj,"dest"], the object obj can be a function with head APIFunction or FormFunction, according to an embodiment.

Destinations relevant to the web may include:
"WebPage" URL for complete web page
"IFrame" embed code for an embeddable iframe
"HTML" standalone HTML code to be embedded on a page
{"dest",framework} use the specified framework for the code generated Possible frameworks for interactive web content may include:
"CloudCDF" CloudCDF with interactivity purely powered by the cloud
"CloudCDFAllowingPlugin" CloudCDF with autodetection of local CDF plugin
"CDFPlugin" cloud-hosted CDF for CDF plugin Destinations relevant to languages may include: "Java", "Python", "JavaScript", "C#", etc.

In typical cases of external programming languages, EmbedCode returns an EmbeddingObject containing an Association giving a variety of elements necessary for the embedding.

Typical options for EmbedCode may include:
ExternalOptions <||>options specific to each environment or language
ExternalFunctionName Automatic name to use for generated external function
ExternalTypeSignature Automatic rules specifying mappings to external types
ImageSize Automatic size of embedded object in pixels
Method Automatic embedding method to use
Permissions Automatic permissions to set for the cloud object With the default setting Permissions->Automatic, EmbedCode[obj] will preserve the permissions for a cloud object obj and will use permissions given by $Permissions if a new cloud object is created, according to an embodiment.

With an explicit setting for Permissions, EmbedCode[obj] will effectively use SetOptions to change permissions of a cloud object obj, according to an embodiment.

ExternalTypeSignature->{{"var$_1$"->"type$_1$", ... }, "rettype"} specifies that var$_i$ should be of external type type$_i$, and that the return type for the whole function should be rettype.

ExternalTypeSignature->{{"type$_1$","type$_2$", ... },"rettype"} takes the nth argument to be of type type$_n$.

The type$_i$ are native types specified as they are named in the target language.

In many languages, possible external types include: "int", "double", "string".

The types of arguments can often be inferred from other data in APIFunction, etc. where they appear. A type of Automatic will use the inferred form.

In languages where types are used, the return type typically has to be set explicitly.

ExternalTypeSignature->"rettype" specifies the return type, and if possible infers all argument types.

In languages with dynamic typing, or without types, types do not usually have to be set.

Figures 32A, 32B:
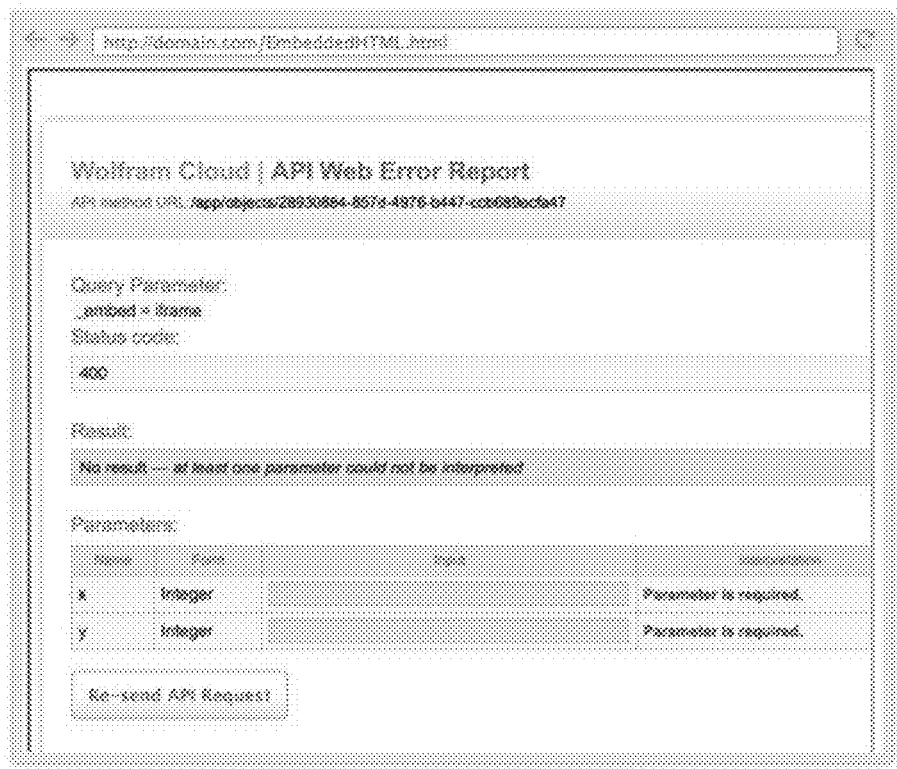
FIG. 32A is an illustration of a notebook including example programmer input in a first programming language for generating code in a second programming language for accessing an API deployed to network-accessible storage, according to an embodiment.
FIG. 32B is an illustration of a web page that includes the code for accessing an API deployed to network-accessible storage, according to an embodiment.
Figure 37:
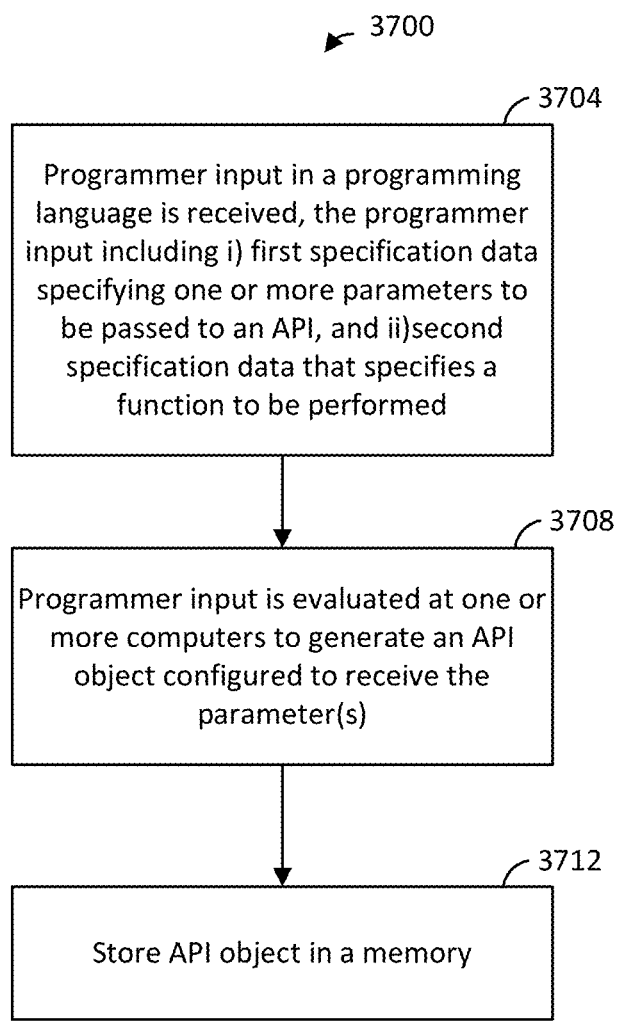
FIG. 37 is a flow diagram of an example method for using programmer input in a first programming language to generate code in a second programming language for accessing an object deployed to network-accessible storage, according to an embodiment.

FIG. 32A illustrates an example notebook 3200 in which EmbedCode, CloudDeploy, and APIFunction are used to generate HTML code for accessing an API deployed to the cloud. The generated HTML code can be inserted into source code of a web page in order for the web page to utilize the API. FIG. 32B illustrates an example web page that utilizes the generated HTML code.

FIG. 33 illustrates an example notebook 3300 in which EmbedCode, CloudDeploy, and APIFunction are used to generate Python code for accessing an API deployed to the cloud. The generated Python code can be inserted a Python source code file to allow the Python code to access the API.

Figure 34:
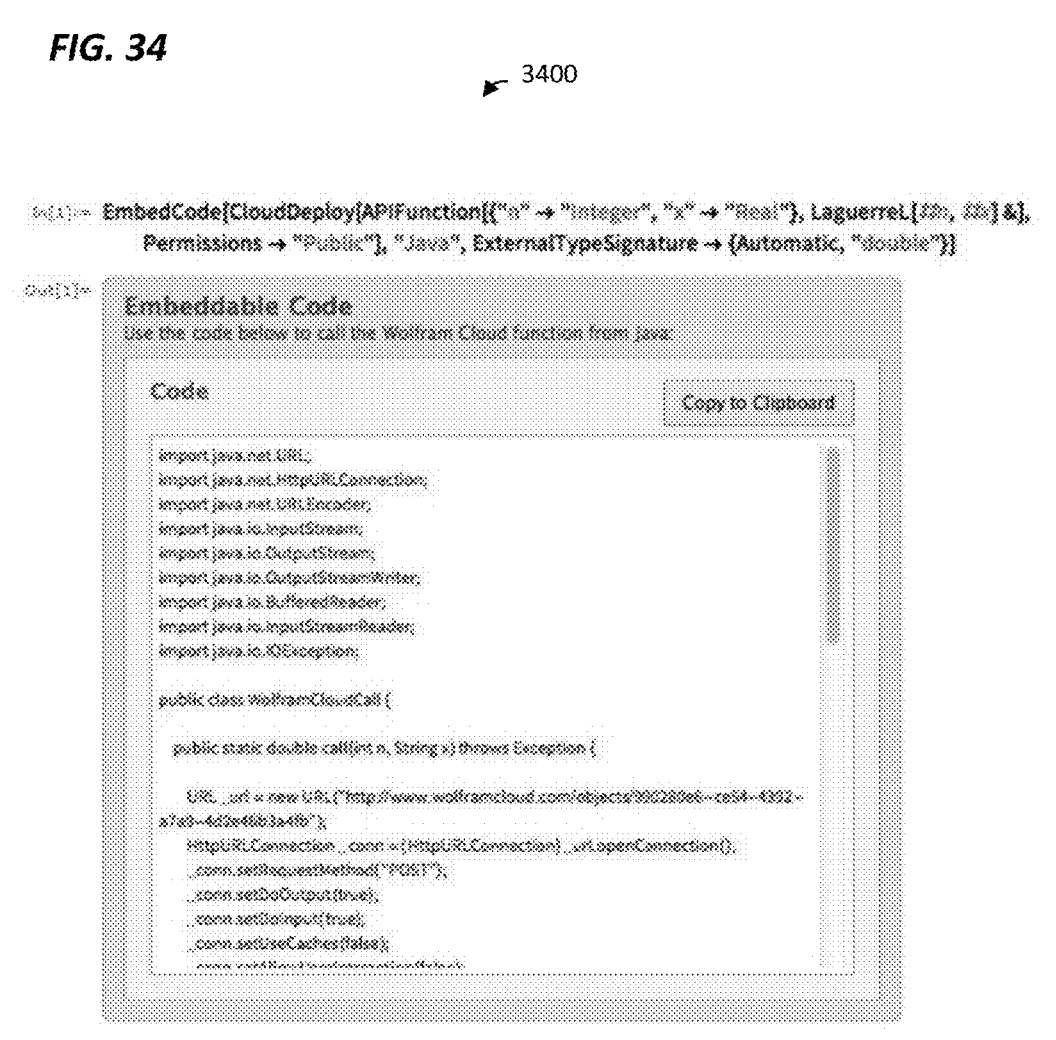

FIG. 34 illustrates an example notebook 3400 in which EmbedCode, CloudDeploy, and APIFunction are used to generate JAVA code for accessing an API deployed to the cloud. The generated JAVA code can be inserted a JAVA source code file to allow the JAVA code to access the API.

FIG. 35 illustrates an example notebook 3500 in which EmbedCode, CloudDeploy, and APIFunction are used to generate JAVA code for accessing an API deployed to the cloud. The generated JAVA code can be inserted a JAVA source code file to allow the JAVA code to access the API.

FIG. 36 illustrates an example notebook 3600 in which EmbedCode is used to generate JAVA code for accessing an API deployed to the cloud. The generated JAVA code can be inserted a JAVA source code file to allow the JAVA code to access the API. In the example of FIG. 36, the object "co" is as defined in FIG. 35.

In various embodiments, functions describe herein can be modified, omitted, combined with other functions, etc. For example, in some embodiments, CloudDeploy and FormFunction are combined into single function, in an embodiment. As another example, CloudDeploy and APIFunction are combined into single function, in an embodiment. As another example, CloudDeploy and EmbedCode are combined into single function, in an embodiment. As another example, CloudDeploy and EmbedCode and APIFunction are combined into single function, in an embodiment. As another example, CloudDeploy and EmbedCode and FormFunction are combined into single function, in an embodiment.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" or the phrase "in an embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

At least some of the various blocks, operations, and techniques described above may be implemented utilizing hardware, a processor executing firmware instructions, a processor executing software instructions, or any combination thereof. When implemented in hardware, the hardware may comprise one or more of discrete components, an integrated circuit, an ASIC, a programmable logic device, etc. When implemented utilizing a processor executing software or firmware instructions, the software or firmware instructions may be stored in any tangible, non-transitory computer readable medium or media such as a magnetic disk, an optical disk, a tape drive, a RAM, a ROM, a flash memory, a memory of a processor, etc. Likewise, the software or firmware instructions may be delivered to a user or a system via any known or desired delivery method including, for example, on a tangible, non-transitory computer readable medium or media, or via communication media. The software or firmware instructions may include machine readable instructions that, when executed by the processor, cause the processor to perform various acts.

Upon reading this disclosure, those of skill in the art will appreciate still additional alternative structural and functional designs for a system and a process for identifying terminal road segments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for generating an electronic form, the method comprising:
   receiving, at one or more computers, programmer input in a programming language, the programmer input including i) specification data corresponding to an electronic form to be generated, and ii) a parameter that indicates a function to be applied to user input;
   evaluating, at one or more computers, the programmer input to generate an electronic form object that includes one or more user-interface mechanisms for receiving the user input, wherein
   evaluating the programmer input to generate the electronic form object includes evaluating the specification data and/or the parameter that indicates the function to generate code in the electronic form object, the generated code capable of being processed by an application to render the electronic form on a display device, and the electronic form object is generated such that the electronic form object is configured to apply, upon being processed by the application, the function to the user input received via the one or more user-interface mechanisms; and
   storing the electronic form object in a memory of or communicatively coupled to the one or more computers.

2. The method of claim 1, wherein evaluating the received instruction to generate the electronic form object comprises:
   if the specification includes one or more parameters corresponding to graphical appearance of the electronic form, generating the electronic form object according to the one or more parameters corresponding to graphical appearance; and
   if the specification omits one or more parameters corresponding to graphical appearance of the electronic form, generating the electronic form object according to one or more default rules.

3. The method of claim 1, wherein the parameter that indicates of the function to be applied to user input is a built-in function of the programming language.

4. The method of claim 1, wherein the parameter that indicates of the function to be applied to user input corresponds to a user defined function expressed using the programming language.

5. The method of claim 1, wherein evaluating the programmer input to generate the electronic form object comprises generating the electronic form object to be configured to:
   receive a natural language input via one of user-interface mechanisms;
   perform natural language processing on the natural language input to generate a processed input; and
   apply the function to the processed input.

6. The method of claim 1, wherein:
   the programmer input is a single built-in function of the programming language;
   the parameter is a first parameter of the built-in function; and
   the specification data is one or more second parameters of the built-in function.

7. The method of claim 1, wherein:
   receiving the programmer input comprises receiving the programmer input as a parameter of a built-in function of the programming language, the built-in function corresponding to cloud deployment; and
   the method further includes:
      evaluating, at one or more computers, the built-in function, and
      in response to evaluating the built-in function, storing the electronic form object in the memory such that the electronic form object is accessible on the Internet via a web browser.

8. The method of claim 1, wherein evaluating the specification data and/or the function to be applied to generate code includes:
   evaluating the specification data to determine a data type of input to the function indicated by the parameter, and
   based on the determined data type, generating code corresponding to a user interface mechanism appropriate for the determined data type.

9. The method of claim 8, wherein:
   the specification data indicates a string data type of user input is to be received via the electronic form; and
   evaluating the specification data to generate code includes:

evaluating the specification data to determine the string data type of user input is to be received via the electronic form, and based on determining the string data type of user input is to be received via the electronic form, generating code corresponding to a text box for receiving user input of the string data type.

10. The method of claim 8, wherein:

the specification data indicates a list from which one or more items are to be selected by a user for input to the function indicated by the parameter; and evaluating the specification data to generate code includes:

evaluating the specification data to determine that the user is to select one or more items from the list, and based on determining that the user is to select one or more items from the list, generating code corresponding to a user interface mechanism appropriate for the user to select one or more items from the list.

11. The method of claim 8, wherein:

the specification data indicates a file data type of user input is to be received via the electronic form; and evaluating the specification data to generate code includes:

evaluating the specification data to determine the file data type of user input is to be received via the electronic form, and based on determining the file data type of user input is to be received via the electronic form, generating code corresponding to a user interface mechanism appropriate for the user to select a file.

12. The method of claim 1, wherein evaluating the specification data and/or the function to be applied to generate code includes:

evaluating the specification data to determine a code type, the code type from among a plurality of different code types corresponding to different applications capable of rendering electronic forms; and based on the determined code type, generating code of the determined code type.

13. The method of claim 12, wherein:

the specification data indicates HyperText Markup Language (HTML) code type; and evaluating the specification data to generate code includes:

evaluating the specification data to determine the HTML code type, and based on determining the HTML code type, generating the code i) to include HTML elements and ii) such that the electronic form can be rendered by a web browser.

14. The method of claim 12, wherein:

the specification data indicates Computable Document Format (CDF) code type; and evaluating the specification data to generate code includes:

evaluating the specification data to determine the CDF code type, and based on determining the CDF code type, generating the code i) to include MATHEMATICA functions and ii) such that the electronic form can be rendered by a CDF player.

15. A system for generating an electronic form, comprising:

one or more processors; and one or more memory devices coupled to the one or more processors, the one or more memories storing machine readable instructions that, when executed by the one or more processors, cause the one or more processors to:

receive programmer input in a programming language, the programmer input including i) specification data corresponding to an electronic form to be generated, and ii) a parameter that indicates a function to be applied to user input, cause the programmer input to be evaluated to generate an electronic form object that includes one or more user-interface mechanisms for receiving the user input, wherein evaluating the programmer input to generate the electronic form object includes evaluating the specification data and/or the parameter that indicates the function to generate code in the electronic form object, the generated code capable of being processed by an application to render the electronic form on a display device, and the electronic form object is generated such that the electronic form object is configured to apply, upon being processed by the application, the function to the user input received via the one or more user-interface mechanisms; and wherein the one or more memory devices further store machine readable instructions that, when executed by the one or more processors, cause the one or more processors to store the electronic form object in the one or more memories of the system and/or cause the electronic form object to be stored in one or more other memories communicatively coupled to the system.

16. The system of claim 15, wherein the one or more memories further store machine readable instructions that, when executed by the one or more processors, cause the one or more processors to cause the programmer input to be evaluated so that:

if the specification includes one or more parameters corresponding to graphical appearance of the electronic form, the electronic form object is generated according to the one or more parameters corresponding to graphical appearance; and if the specification omits one or more parameters corresponding to graphical appearance of the electronic form, the electronic form object is generated according to one or more default rules.

17. The system of claim 15, wherein the one or more memories further store machine readable instructions that, when executed by the one or more processors, cause the one or more processors to generate the electronic form so that:

natural language processing is performed on natural language input received via the electronic form to generate a processed input; and the function is applied to the processed input.

18. The system of claim 15, wherein the one or more memories further store machine readable instructions that, when executed by the one or more processors, cause the one or more processors to generate the electronic form so that:

the natural language input received via the electronic form is transmitted to a computer system configured to perform natural language processing; and the processed input is received from the computer system configured to perform natural language processing.

19. The system of claim 15, wherein:

the programmer input comprises is received as a parameter of a built-in function of the programming language, the built-in function corresponding to cloud deployment;

the one or more memories further store machine readable instructions that, when executed by the one or more processors, cause the one or more processors to:
cause the built-in function to be evaluated, and
cause the electronic form object to be stored in i) the one or more memories of the system and/or ii) the one or more other memories communicatively coupled to the system such that the electronic form object is accessible on the Internet via a web browser in response to evaluation of the built-in function.

20. The system of claim 19, wherein the one or more memories further store machine readable instructions that, when executed by the one or more processors, cause the one or more processors to:
transmit the electronic form object to a web server communicatively coupled to the system.

21. The system of claim 15, wherein the one or more memories further store machine readable instructions that, when executed by the one or more processors, cause the one or more processors to cause the specification data and/or the function to be applied to generate code so that:
the specification data is evaluated to determine a data type of input to the function indicated by the parameter, and
based on the determined data type, code corresponding to a user interface mechanism appropriate for the determined data type is generated.

22. The system of claim 21, wherein:
the specification data indicates a string data type of user input is to be received via the electronic form; and
the one or more memories further store machine readable instructions that, when executed by the one or more processors, cause the one or more processors to cause the specification data to be evaluated so that:
the specification data is evaluated to determine the string data type of user input is to be received via the electronic form, and
based on determining the string data type of user input is to be received via the electronic form, code corresponding to a text box for receiving user input of the string data type is generated.

23. The system of claim 21, wherein:
the specification data indicates a list from which one or more items are to be selected by a user for input to the function indicated by the parameter; and
the one or more memories further store machine readable instructions that, when executed by the one or more processors, cause the one or more processors to cause the specification data to be evaluated so that:
the specification data is evaluated to determine that the user is to select one or more items from the list, and
based on determining that the user is to select one or more items from the list, code corresponding to a user interface mechanism appropriate for the user to select one or more items from the list is generated.

24. The system of claim 21, wherein:
the specification data indicates a file data type of user input is to be received via the electronic form; and
the one or more memories further store machine readable instructions that, when executed by the one or more processors, cause the one or more processors to cause the specification data to be evaluated so that:
the specification data is evaluated to determine the file data type of user input is to be received via the electronic form, and
based on determining the file data type of user input is to be received via the electronic form, code corresponding to a user interface mechanism appropriate for the user to select a file is generated.

25. The system of claim 15, wherein the one or more memories further store machine readable instructions that, when executed by the one or more processors, cause the one or more processors to cause the specification data and/or the function to be applied so that:
the specification data is evaluated to determine a code type, the code type from among a plurality of different code types corresponding to different applications capable of rendering electronic forms, and
based on the determined code type, code of the determined code type is generated.

26. A tangible, non-transitory computer readable medium, or media, storing instruction thereon that, when executed by one or more computer processors, cause the one or more computer processors to:
receive programmer input in a programming language, the programmer input including i) specification data corresponding to an electronic form to be generated, and ii) a parameter that indicates a function to be applied to user input;
cause the programmer input to be evaluated to generate an electronic form object that includes one or more user-interface mechanisms for receiving the user input, wherein
evaluating the programmer input to generate the electronic form object includes evaluating the specification data and/or the parameter that indicates the function to generate code in the electronic form object, the generated code capable of being processed by an application to render the electronic form on a display device, and
the electronic form object is generated such that the electronic form object is configured to apply, upon being processed by the application, the function to the user input received via the one or more user-interface mechanisms; and
cause the electronic form object to be stored in one or more memories of a computer system.

* * * * *